US012663611B2

(12) United States Patent　　(10) Patent No.:　US 12,663,611 B2
Machida　　　　　　　　　　　　(45) Date of Patent:　Jun. 23, 2026

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventor: Kosuke Machida, Tokyo (JP)

(73) Assignee: Nikon Corporation, Tokyo (JP)

( * ) Notice: Subject to any disclaimer, the term of this patent is extended or adjusted under 35 U.S.C. 154(b) by 337 days.

(21) Appl. No.: 18/271,465

(22) PCT Filed: Jan. 21, 2022

(86) PCT No.: PCT/JP2022/002148
§ 371 (c)(1),
(2) Date: Jul. 9, 2023

(87) PCT Pub. No.: WO2022/172725
PCT Pub. Date: Aug. 18, 2022

(65) Prior Publication Data
US 2024/0053582 A1　Feb. 15, 2024

(30) Foreign Application Priority Data

Feb. 15, 2021　(JP) ................................. 2021-021654

(51) Int. Cl.
*G02B 9/34*　　　(2006.01)
(52) U.S. Cl.
CPC ..................................... *G02B 9/34* (2013.01)
(58) Field of Classification Search
CPC .......... G02B 15/144; G02B 15/144105; G02B 15/144113; G02B 15/144505; G02B 15/144513; G02B 9/34
See application file for complete search history.

(56) References Cited

U.S. PATENT DOCUMENTS

2017/0108674 A1　4/2017　Ichikawa
2018/0067281 A1　3/2018　Ichikawa et al.
(Continued)

FOREIGN PATENT DOCUMENTS

CN　　111025611 A　　4/2020
JP　　H04-110811 A　　4/1992
(Continued)

OTHER PUBLICATIONS

International Search Report from International Patent Application No. PCT/JP2022/002148, Apr. 19, 2022.
(Continued)

*Primary Examiner* — Joseph P Martinez
(74) *Attorney, Agent, or Firm* — Potomac Law Group, PLLC

(57)　　　　ABSTRACT

An optical system (OL) has a first lens group (G1), a first focusing lens group (GF1) having a negative refractive power, and a second focusing lens group (GF2) having a positive refractive power, arranged in the stated order from the object side along the optical axis, the first focusing lens group (GF1) and the second focusing lens group (GF2) moving along the optical axis in mutually different trajectories during focusing, and the optical system (OL) furthermore having an aperture diaphragm (S) disposed further toward the object side than the first focusing lens group (GF1), and satisfying the following conditional expression: $0.68 < (-fF1)/fF2 < 3.60$, where fF1 is the focal length of the first focusing lens group (GF1), and fF2 is the focal length of the second focusing lens group (GF2).

26 Claims, 11 Drawing Sheets

(56) References Cited

U.S. PATENT DOCUMENTS

| | | |
|---|---|---|
| 2020/0110242 A1 | 4/2020 | Nakahara et al. |
| 2021/0223522 A1 | 7/2021 | Mogi |
| 2022/0035124 A1* | 2/2022 | Yoshinaga ......... G02B 15/1461 |

FOREIGN PATENT DOCUMENTS

| | | |
|---|---|---|
| JP | 2013083783 A | 5/2013 |
| JP | 2014-006487 A | 1/2014 |
| JP | 2014-026023 A | 2/2014 |
| JP | 2017211489 A | 11/2017 |
| JP | 2018005099 A | 1/2018 |
| JP | 2020-060660 A | 4/2020 |
| JP | 2021113905 A | 8/2021 |
| JP | 2022021154 A | 2/2022 |
| WO | 2016021221 A1 | 2/2016 |
| WO | 2016194111 A1 | 12/2016 |
| WO | 2020158622 A1 | 8/2020 |

OTHER PUBLICATIONS

Office Action issued Feb. 25, 2025, in Japanese Patent Application No. 2024-036626.
International Preliminary Report on Patentability from International Patent Application No. PCT/JP2022/002148, Aug. 24, 2023.
Office Action issued Nov. 7, 2023, in Japanese Patent Application No. 2022-581292.
Office Action issued Mar. 23, 2026, in Chinese Patent Application No. 202280012851.0.

* cited by examiner

SPHERICAL ABERRATION          ASTIGMATISM          DISTORTION          COMA ABERRATION

CHROMATIC ABERRATION OF MAGNIFICATION

SPHERICAL ABERRATION          ASTIGMATISM          DISTORTION          COMA ABERRATION

CHROMATIC ABERRATION OF MAGNIFICATION

SPHERICAL ABERRATION

ASTIGMATISM

DISTORTION

CHROMATIC ABERRATION OF MAGNIFICATION

COMA ABERRATION

SPHERICAL ABERRATION

ASTIGMATISM

DISTORTION

CHROMATIC ABERRATION OF MAGNIFICATION

COMA ABERRATION

FIG.7

OPTICAL SYSTEM, OPTICAL APPARATUS AND METHOD FOR MANUFACTURING THE OPTICAL SYSTEM

TECHNICAL FIELD

The present invention relates to an optical system, an optical apparatus, and a method for manufacturing the optical system.

TECHNICAL BACKGROUND

In related art, an optical system suitable for a photographic camera, an electronic still camera, a video camera, or the like has been proposed (for example, see Patent Literature 1). In such an optical system, it is difficult to suppress an aberration fluctuation in focusing.

PRIOR ARTS LIST

Patent Document

Patent Literature 1: Japanese Laid-Open Patent Publication No. 2018-5099(A)

SUMMARY OF THE INVENTION

A first optical system according to the present invention comprises a first lens group, a first focusing lens group having negative refractive power, and a second focusing lens group having positive refractive power, which are arranged in order from an object side along an optical axis, the first focusing lens group and the second focusing lens group move along the optical axis in loci, which are different from each other, in focusing, the optical system further comprises an aperture stop which is arranged on the object side relative to the first focusing lens group, and the following conditional expression is satisfied:

$$0.68 < (-fF1)/fF2 < 3.60$$

where fF1: a focal length of the first focusing lens group, and
fF2: a focal length of the second focusing lens group.

A second optical system according to the present invention comprises a first lens group, a first focusing lens group having negative refractive power, a second focusing lens group having positive refractive power, and a succeeding lens group having negative refractive power, which are arranged in order from an object side along an optical axis, the first focusing lens group and the second focusing lens group move along the optical axis in loci, which are different from each other, in focusing, the optical system further comprises an aperture stop which is arranged on the object side relative to the first focusing lens group, and the following conditional expression is satisfied:

$$0.60 < fF2/(-fR) < 1.10$$

where fF2: a focal length of the second focusing lens group, and
fR: a focal length of the succeeding lens group.

An third optical system according to the present invention comprises a first lens group, a first focusing lens group having negative refractive power, and a second focusing lens group having positive refractive power, which are arranged in order from an object side along an optical axis, the first focusing lens group and the second focusing lens group move along the optical axis in loci, which are different from each other, in focusing, and the following conditional expression is satisfied:

$$f1/|f1R| < 1.00$$

where f1: a focal length of the first lens group, and
f1R: a combined focal length of a lens group arranged on an image side relative to the first lens group upon focusing on infinity.

A fourth optical system according to the present invention comprises a first lens group, an aperture stop, a first focusing lens group, and a second focusing lens group, which are arranged in order from an object side along an optical axis, the first focusing lens group and the second focusing lens group move along the optical axis in loci, which are different from each other, in focusing, and the first focusing lens group includes at least two negative lenses.

An optical apparatus according to the present invention is configured to include the optical system.

A first method according to the present invention for manufacturing an optical system comprising a first lens group, a first focusing lens group having negative refractive power, and a second focusing lens group having positive refractive power, which are arranged in order from an object side along an optical axis, comprises a step of disposing the lens groups in a lens barrel so that;

the first focusing lens group and the second focusing lens group moves along the optical axis in loci, which are different from each other, in focusing,
the optical system further comprises an aperture stop which is arranged on the object side relative to the first focusing lens group, and
the following conditional expression is satisfied:

$$0.68 < (-fF1)/fF2 < 3.60$$

where fF1: a focal length of the first focusing lens group, and
fF2: a focal length of the second focusing lens group.

A second method according to the present invention for manufacturing an optical system comprising a first lens group, a first focusing lens group having negative refractive power, a second focusing lens group having positive refractive power, and a succeeding lens group having negative refractive power, which are arranged in order from an object side along an optical axis, comprises a step of disposing the lens groups in a lens barrel so that;

the first focusing lens group and the second focusing lens group move along the optical axis in loci, which are different from each other, in focusing,
the optical system further comprises an aperture stop which is arranged on the object side relative to the first focusing lens group, and
the following conditional expression is satisfied:

$$0.60 < fF2/(-fR) < 1.10$$

where fF2: a focal length of the second focusing lens group, and
fR: a focal length of the succeeding lens group.

A third method according to the present invention for manufacturing an optical system comprising a first lens group, a first focusing lens group having negative refractive power, and a second focusing lens group having positive refractive power, which are arranged in order from an object side along an optical axis, comprises a step of disposing the lens groups in a lens barrel so that;

the first focusing lens group and the second focusing lens group move along the optical axis in loci, which are different from each other, in focusing, and the following conditional expression is satisfied:

$$f1/|f1R|<1.00$$

where f1: a focal length of the first lens group, and f1R: a combined focal length of a lens group arranged on an image side relative to the first lens group upon focusing on infinity.

A fourth method according to the present invention for manufacturing an optical system comprising a first lens group, an aperture stop, a first focusing lens group, and a second focusing lens group, which are arranged in order from an object side along an optical axis, comprises a step of disposing the lens groups in a lens barrel so that;

the first focusing lens group and the second focusing lens group move along the optical axis in loci, which are different from each other, in focusing, and the first focusing lens group includes at least two negative lenses.

BRIEF DESCRIPTION OF THE DRAWINGS

FIG. 7 is a diagram illustrating a configuration of a camera which includes an optical system according to each embodiment;

DESCRIPTION OF THE EMBODIMENTS

Figure 7:
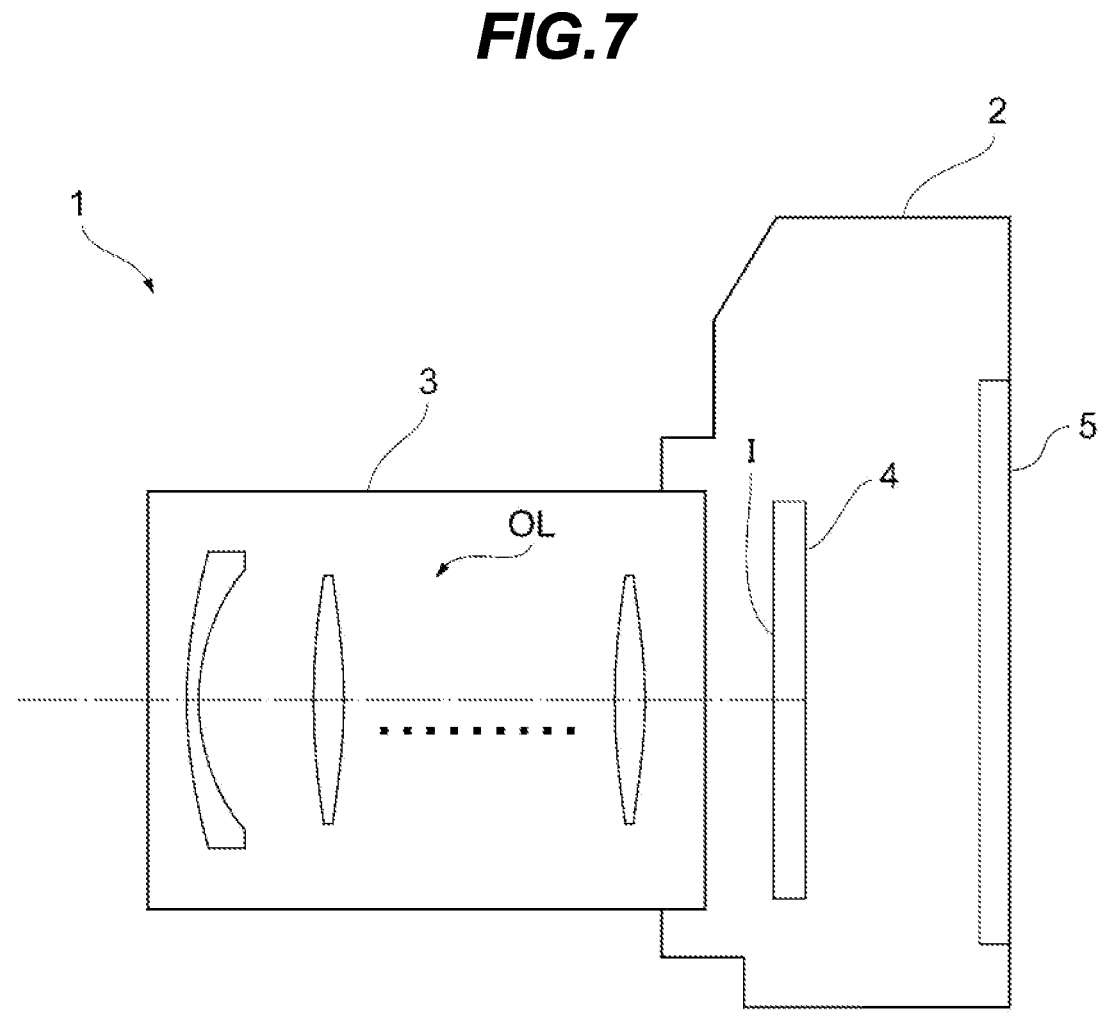
Figure 1:
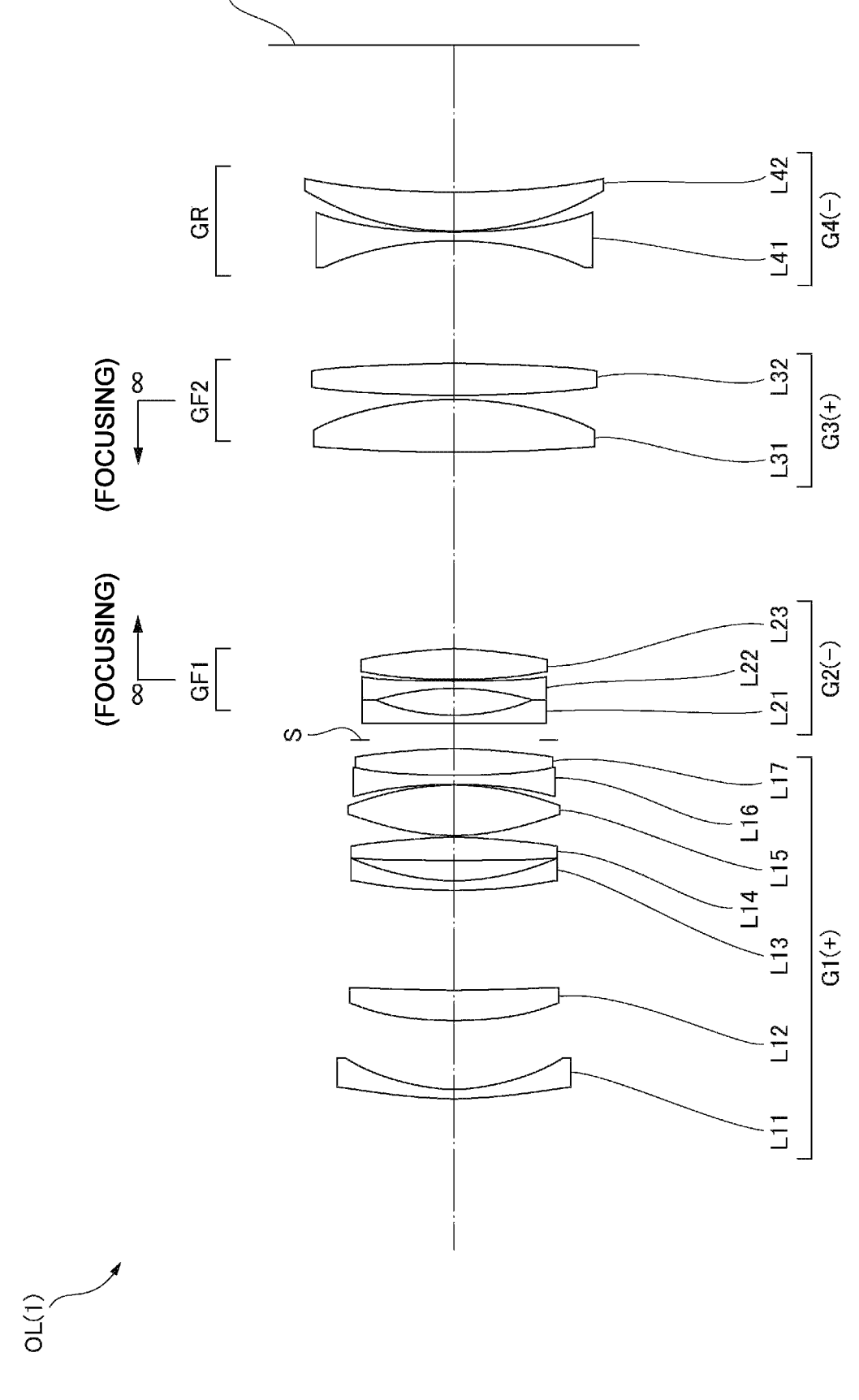
FIG. 1 is a diagram illustrating a lens configuration of an optical system according to a first example.

Preferable embodiments according to the present invention will hereinafter be described. First, a description will be made, based on FIG. 7, about a camera (optical apparatus) including an optical system according to each of the embodiments. As illustrated in FIG. 7, this camera 1 is formed from a main body 2 and a photographing lens 3 to be mounted on the main body 2. The main body 2 includes an image-capturing element 4, a main-body control part (not illustrated) which controls actions of a digital camera, and a liquid crystal screen 5. The photographing lens 3 includes an optical system OL which is formed with plural lens groups and a lens position control mechanism (not illustrated) which controls a position of each of the lens groups. The lens position control mechanism is formed from a sensor which detects a position of the lens group, a motor which moves the lens group forward and rearward along an optical axis, a control circuit which drives a motor, and so forth.

Light from a photographed object is collected by the optical system OL of the photographing lens 3 and reaches an image surface I of the image-capturing element 4. Light from the photographed object which reaches the image surface I is subjected to photoelectric conversion by the image-capturing element 4 and is recorded as digital image data in a memory which is not illustrated. The digital image data recorded in the memory can be displayed on the liquid crystal screen 5 in response to an operation by a user. Note that this camera may be a mirrorless camera or a single-lens reflex camera having an instant return mirror. Further, the optical system OL illustrated in FIG. 7 schematically illustrates the optical system which is included in the photographing lens 3, and a lens configuration of the optical system OL is not limited to this configuration.

Next, an optical system according to a first embodiment will be described. As illustrated in FIG. 1, an optical system OL(1) as one example of the optical system OL according to the first embodiment is configured to comprise a first lens group G1, a first focusing lens group GF1 having negative refractive power, and a second focusing lens group GF2 having positive refractive power, which are arranged in order from an object side along the optical axis. In focusing, the first focusing lens group GF1 and the second focusing lens group GF2 move along the optical axis in loci which are different from each other. Further, the optical system OL according to the first embodiment further comprises an aperture stop S which is arranged on the object side relative to the first focusing lens group GF1.

In the above configuration, the optical system OL according to the first embodiment satisfies the following conditional expression (1):

$$0.68<(-fF1)/fF2<3.60 \tag{1}$$

where fF1: a focal length of the first focusing lens group GF1, and fF2: a focal length of the second focusing lens group GF2.

In the first embodiment, it becomes possible to obtain an optical system with a small aberration fluctuation in focusing and an optical apparatus which includes the optical system. Further, because size reduction and weight reduction of the focusing lens groups can be achieved, an optical system can be obtained which is capable of realizing high-speed and quiet autofocus (AF) performance without increasing a size of a barrel. The optical system OL according to the first embodiment may be an optical system OL(2) illustrated in FIG. 3 or may be an optical system OL(3) illustrated in FIG. 5.

The conditional expression (1) defines an appropriate relationship between the focal length of the first focusing lens group GF1 and the focal length of the second focusing lens group GF2. By satisfying the conditional expression (1), fluctuations in various aberrations including a spherical aberration in focusing can thereby be suppressed.

Because when a corresponding value of the conditional expression (1) exceeds an upper limit value, refractive power of the second focusing lens group GF2 becomes too strong, it becomes difficult to suppress fluctuations in various aberrations including the spherical aberration in focusing. The upper limit value of the conditional expression (1)

is set to 3.50, 3.30, 3.00, 2.75, 2.50, 2.20, 2.00, or further 1.85, and effects of the present embodiment can thereby more certainly be obtained.

Because when the corresponding value of the conditional expression (1) becomes below a lower limit value, refractive power of the first focusing lens group GF1 becomes too strong, it becomes difficult to suppress fluctuations in various aberrations including the spherical aberration in focusing. The lower limit value of the conditional expression (1) is set to 0.70, 0.72, 0.75, 0.78, 0.80, or further 0.82, and effects of the present embodiment can thereby more certainly be obtained.

Next, an optical system according to a second embodiment will be described. As illustrated in FIG. 1, an optical system OL(1) as one example of the optical system OL according to the second embodiment is configured to comprise the first lens group G1, the first focusing lens group GF1 having negative refractive power, the second focusing lens group GF2 having positive refractive power, and a succeeding lens group GR having negative refractive power, which are arranged in order from the object side along the optical axis. In focusing, the first focusing lens group GF1 and the second focusing lens group GF2 move along the optical axis in loci which are different from each other. Further, the optical system OL according to the second embodiment further comprises the aperture stop S which is arranged on the object side relative to the first focusing lens group GF1.

In the above configuration, the optical system OL according to the second embodiment satisfies the following conditional expression (2):

$$0.60 < fF2/(-fR) < 1.10 \qquad (2)$$

where fF2: the focal length of the second focusing lens group GF2, and fR: a focal length of the succeeding lens group GR.

In the second embodiment, it becomes possible to obtain an optical system with a small aberration fluctuation in focusing and an optical apparatus which includes the optical system. Further, because size reduction and weight reduction of the focusing lens groups can be achieved, an optical system can be obtained which is capable of realizing high-speed and quiet autofocus (AF) performance without increasing the size of the barrel. The optical system OL according to the second embodiment may be the optical system OL(2) illustrated in FIG. 3 or may be the optical system OL(3) illustrated in FIG. 5.

The conditional expression (2) defines an appropriate relationship between the focal length of the second focusing lens group GF2 and the focal length of the succeeding lens group GR. By satisfying the conditional expression (2), fluctuations in various aberrations including the spherical aberration in focusing can thereby be suppressed.

Because when a corresponding value of the conditional expression (2) exceeds an upper limit value, refractive power of the succeeding lens group GR becomes too strong, it becomes difficult to suppress fluctuations in various aberrations including the spherical aberration in focusing. The upper limit value of the conditional expression (2) is set to 1.08, 1.05, 1.03, 1.00, or further 0.98, and effects of the present embodiment can thereby more certainly be obtained.

Because when the corresponding value of the conditional expression (2) becomes below a lower limit value, the refractive power of the second focusing lens group GF2 becomes too strong, it becomes difficult to suppress fluctuations in various aberrations including the spherical aberration in focusing. The lower limit value of the conditional expression (2) is set to 0.62 or further 0.64, and the effects of the present embodiment can thereby more certainly be obtained.

In the optical system OL according to the second embodiment, it is desirable that the succeeding lens group GR includes at least two lens components. Accordingly, various aberrations including a coma aberration upon focusing on infinity can properly be corrected. Note that in each of the embodiments, a lens component denotes a single lens or a cemented lens.

Next, an optical system according to a third embodiment will be described. As illustrated in FIG. 1, an optical system OL(1) as one example of the optical system OL according to the third embodiment is configured to comprises the first lens group G1, the first focusing lens group GF1 having negative refractive power, and the second focusing lens group GF2 having positive refractive power, which are arranged in order from the object side along the optical axis. In focusing, the first focusing lens group GF1 and the second focusing lens group GF2 move along the optical axis in loci which are different from each other.

In the above configuration, the optical system OL according to the third embodiment satisfies the following conditional expression (3):

$$f1/|f1R| < 1.00 \qquad (3)$$

where f1: a focal length of the first lens group G1, and
f1R: a combined focal length of a lens group arranged on an image side relative to the first lens group G1 upon focusing on infinity.

In the third embodiment, it becomes possible to obtain an optical system with a small aberration fluctuation in focusing and an optical apparatus which includes the optical system. Further, because size reduction and weight reduction of the focusing lens groups can be achieved, an optical system can be obtained which is capable of realizing high-speed and quiet autofocus (AF) performance without increasing the size of the barrel. The optical system OL according to the third embodiment may be the optical system OL(2) illustrated in FIG. 3 or may be the optical system OL(3) illustrated in FIG. 5.

The conditional expression (3) defines an appropriate relationship between the focal length of the first lens group G1 and the combined focal length of the lens group arranged on the image side relative to the first lens group G1 upon focusing on infinity. By satisfying the conditional expression (3), various aberrations including a spherical aberration upon focusing on infinity can properly be corrected.

Because when a corresponding value of the conditional expression (3) exceeds an upper limit value, refractive power of the lens group arranged on the image side relative to the first lens group G1 becomes too strong, it becomes difficult to correct various aberrations including the spherical aberration upon focusing on infinity. The upper limit value of the conditional expression (3) is set to 0.90, 0.80, 0.75, 0.70, 0.65, 0.60, 0.55, 0.50, or further 0.45, and the effects of the present embodiment can thereby more certainly be obtained. The lower limit value of the conditional expression (3) is set to 0.05, 0.10, 0.15, 0.20, 0.25, or further 0.30, and effects of the present embodiment can thereby more certainly be obtained.

It is desirable that the optical system OL according to the third embodiment further comprises the aperture stop S which is arranged on the object side relative to the first focusing lens group GF1. Accordingly, fluctuations in various aberrations including the spherical aberration in focusing can be suppressed.

Next, an optical system according to a fourth embodiment will be described. As illustrated in FIG. 1, an optical system OL(1) as one example of the optical system OL according to the fourth embodiment is configured to comprise the first lens group G1, the aperture stop S, the first focusing lens group GF1, and the second focusing lens group GF2, which are arranged in order from the object side along the optical axis. In focusing, the first focusing lens group GF1 and the second focusing lens group GF2 move along the optical axis in loci which are different from each other. Further, the first focusing lens group GF1 includes at least two negative lenses.

In the fourth embodiment, it becomes possible to obtain an optical system with a small aberration fluctuation in focusing and an optical apparatus which includes the optical system. Further, because size reduction and weight reduction of the focusing lens groups can be achieved, an optical system can be obtained which is capable of realizing high-speed and quiet autofocus (AF) performance without increasing the size of the barrel. The optical system OL according to the fourth embodiment may be the optical system OL(2) illustrated in FIG. 3 or may be the optical system OL(3) illustrated in FIG. 5.

In the optical system OL according to the fourth embodiment, it is desirable that the first focusing lens group GF1 have negative refractive power and the second focusing lens group GF2 have positive refractive power. Accordingly, without increasing the size of each of the focusing lens groups, fluctuations in various aberrations including the spherical aberration in focusing can be suppressed.

It is desirable that each of the optical systems OL according to the second embodiment, the third embodiment, and the fourth embodiment satisfy the above-described conditional expression (1). By satisfying the conditional expression (1), similarly to the first embodiment, fluctuations in various aberrations including the spherical aberration in focusing can thereby be suppressed. The upper limit value of the conditional expression (1) is set to 3.50, 3.30, 3.00, 2.75, 2.50, 2.20, 2.00, or further 1.85, and effects of each of the embodiments can thereby more certainly be obtained. Further, the lower limit value of the conditional expression (1) is set to 0.70, 0.72, 0.75, 0.78, 0.80, or further 0.82, and the effects of each of the embodiments can thereby more certainly be obtained.

It is desirable that each of the optical systems OL according to the first embodiment, the third embodiment, and the fourth embodiment further have the succeeding lens group GR, which is arranged on the image side relative to the second focusing lens group GF2 and has negative refractive power, and satisfy the above-described conditional expression (2). By satisfying the conditional expression (2), similarly to the second embodiment, fluctuations in various aberrations including the spherical aberration in focusing can thereby be suppressed. The upper limit value of the conditional expression (2) is set to 1.08, 1.05, 1.03, 1.00, or further 0.98, and the effects of each of the embodiments can thereby more certainly be obtained. Further, the lower limit value of the conditional expression (2) is set to 0.62 or further 0.64, and the effects of each of the embodiments can thereby more certainly be obtained.

Further, in this case, it is desirable that the succeeding lens group GR includes at least two lens components. Accordingly, various aberrations including the coma aberration upon focusing on infinity can properly be corrected.

It is desirable that each of the optical systems OL according to the first embodiment, the second embodiment, and the fourth embodiment satisfy the above-described conditional expression (3). By satisfying the conditional expression (3), similarly to the third embodiment, various aberrations including the spherical aberration upon focusing on infinity can properly be corrected. The upper limit value of the conditional expression (3) is set to 0.90, 0.80, 0.75, 0.70, 0.65, 0.60, 0.55, 0.50, or further 0.45, and the effects of each of the embodiments can thereby more certainly be obtained. Further, the lower limit value of the conditional expression (3) is set to 0.05, 0.10, 0.15, 0.20, 0.25, or further 0.30, and the effects of each of the embodiments can thereby more certainly be obtained.

It is desirable that the optical system OL according to the third embodiment further comprises the aperture stop S which is arranged on the object side relative to the first focusing lens group GF1. Accordingly, fluctuations in various aberrations including the spherical aberration in focusing can be suppressed.

It is desirable that each of the optical systems OL according to the first embodiment, the second embodiment, and the fourth embodiment satisfy the following conditional expression (4). Further, it is desirable that the optical system OL according to the third embodiment further have the aperture stop S which is arranged on the object side relative to the first focusing lens group GF1 and satisfy the following conditional expression (4):

$$0.50 < Lre/Lfr < 4.00 \tag{4}$$

where Lfr: a distance, on the optical axis, from a lens surface of the optical system OL, which is closest to the object side, to the aperture stop S, and Lre: a distance, on the optical axis, from the aperture stop S to the image surface I.

The conditional expression (4) defines an appropriate relationship between the distance, on the optical axis, from the lens surface of the optical system OL, which is closest to the object side, to the aperture stop S and the distance, on the optical axis, from the aperture stop S to the image surface I. By satisfying the conditional expression (4), various aberrations including the spherical aberration upon focusing on infinity can properly be corrected.

Because when a corresponding value of the conditional expression (4) exceeds an upper limit value, the distance on the optical axis from the aperture stop S to the image surface I becomes too long, it becomes difficult to correct various aberrations including the spherical aberration upon focusing on infinity. The upper limit value of the conditional expression (4) is set to 3.80, 3.65, 3.50, 3.40, 3.30, 3.20, or further 3.10, and the effects of each of the embodiments can thereby more certainly be obtained.

Because when the corresponding value of the conditional expression (4) becomes below a lower limit value, the distance on the optical axis from the lens surface of the optical system OL, which is closest to the object side, to the aperture stop S becomes too long, it becomes difficult to correct various aberrations including the spherical aberration upon focusing on infinity. Further, the lower limit value of the conditional expression (4) is set to 0.60, 0.70, 0.80, 0.90, 1.00, 1.10, 1.20, or further 1.30, and the effects of each of the embodiments can thereby more certainly be obtained.

It is desirable that each of the optical systems OL according to the first to fourth embodiments satisfy the following conditional expression (5):

$$0.45 < f1/(-fF1) < 2.50 \tag{5}$$

where f1: the focal length of the first lens group G1, and fF1: the focal length of the first focusing lens group GF1.

The conditional expression (5) defines an appropriate relationship between the focal length of the first lens group G1 and the focal length of the first focusing lens group GF1. By satisfying the conditional expression (5), various aberrations including the spherical aberration upon focusing on infinity can properly be corrected, and fluctuations in various aberrations including a spherical aberration in focusing from an object at infinity to an object at a short distance can be suppressed.

Because when a corresponding value of the conditional expression (5) exceeds an upper limit value, the refractive power of the first focusing lens group GF1 becomes too strong, it becomes difficult to suppress fluctuations in various aberrations including the spherical aberration in focusing from an object at infinity to an object at a short distance. The upper limit value of the conditional expression (5) is set to 2.35, 2.20, 2.10, 2.00, 1.85, 1.70, 1.50, 1.40, or further 1.35, and the effects of each of the embodiments can thereby more certainly be obtained.

Because when the corresponding value of the conditional expression (5) becomes below a lower limit value, the refractive power of the first lens group G1 becomes too strong, it becomes difficult to correct various aberrations including the spherical aberration upon focusing on infinity. The lower limit value of the conditional expression (5) is set to 0.50, 0.55, 0.60, 0.65, 0.70, 0.75, or further 0.80, and the effects of each of the embodiments can thereby more certainly be obtained.

It is desirable that each of the optical systems OL according to the first to fourth embodiments satisfy the following conditional expression (6):

$$0.55 < f1/fF2 < 3.00 \tag{6}$$

where f1: the focal length of the first lens group G1, and
fF2: the focal length of the second focusing lens group GF2.

The conditional expression (6) defines an appropriate relationship between the focal length of the first lens group G1 and the focal length of the second focusing lens group GF2. By satisfying the conditional expression (6), various aberrations including the spherical aberration upon focusing on infinity can properly be corrected, and fluctuations in various aberrations including the spherical aberration in focusing from an object at infinity to an object at a short distance can be suppressed.

Because when a corresponding value of the conditional expression (6) exceeds an upper limit value, the refractive power of the second focusing lens group GF2 becomes too strong, it becomes difficult to suppress fluctuations in various aberrations including the spherical aberration in focusing from an object at infinity to an object at a short distance. The upper limit value of the conditional expression (6) is set to 2.85, 2.70, 2.60, 2.50, 2.40, 2.30, 2.20, or further 2.15, and the effects of each of the embodiments can thereby more certainly be obtained.

Because when the corresponding value of the conditional expression (6) becomes below a lower limit value, the refractive power of the first lens group G1 becomes too strong, it becomes difficult to correct various aberrations including the spherical aberration upon focusing on infinity. The lower limit value of the conditional expression (6) is set to 0.60, 0.65, 0.68, 0.70, 0.73, or further 0.75, and the effects of each of the embodiments can thereby more certainly be obtained.

It is desirable that each of the optical systems OL according to the first to fourth embodiments satisfy the following conditional expression (7):

$$0.10 < f1/f < 1.25 \tag{7}$$

where f1: the focal length of the first lens group G1, and
f: a focal length of the optical system OL upon focusing on infinity.

The conditional expression (7) defines an appropriate relationship between the focal length of the first lens group G1 and the focal length of the optical system OL upon focusing on infinity. By satisfying the conditional expression (7), without increasing the size of the barrel, various aberrations including the spherical aberration upon focusing on infinity can properly be corrected.

Because when a corresponding value of the conditional expression (7) exceeds an upper limit value, the refractive power of the first lens group G1 becomes too weak, the size of the barrel is increased. The upper limit value of the conditional expression (7) is set to 1.20, 1.18, 1.15, 1.13, or further 1.10, and the effects of each of the embodiments can thereby more certainly be obtained.

Because when the corresponding value of the conditional expression (7) becomes below a lower limit value, the refractive power of the first lens group G1 becomes too strong, it becomes difficult to correct various aberrations including the spherical aberration upon focusing on infinity. The lower limit value of the conditional expression (7) is set to 0.15, 0.20, 0.25, 0.30, 0.35, 0.40, 0.45, or further 0.48, and the effects of each of the embodiments can thereby more certainly be obtained.

It is desirable that each of the optical systems OL according to the first to fourth embodiments satisfy the following conditional expression (8):

$$0.05 < Bf/f < 0.65 \tag{8}$$

where Bf: a back focal length of the optical system OL upon focusing on infinity, and
f: the focal length of the optical system OL upon focusing on infinity.

The conditional expression (8) defines an appropriate relationship between the back focal length of the optical system OL upon focusing on infinity and the focal length of the optical system OL upon focusing on infinity. By satisfying the conditional expression (8), various aberrations including the coma aberration upon focusing on infinity can properly be corrected.

When a corresponding value of the conditional expression (8) exceeds an upper limit value, the back focal length becomes long compared to the focal length of the optical system OL, and it becomes difficult to correct various aberrations including the coma aberration upon focusing on infinity. The upper limit value of the conditional expression (8) is set to 0.60, 0.55, 0.50, 0.45, 0.40, or further 0.35, and the effects of each of the embodiments can thereby more certainly be obtained.

When the corresponding value of the conditional expression (8) becomes below a lower limit value, the back focal length becomes short compared to the focal length of the optical system OL, and it becomes difficult to correct various aberrations including the coma aberration upon focusing on infinity. The lower limit value of the conditional expression (8) is set to 0.08, 0.10, or further 0.12, and the effects of the present embodiment can thereby more certainly be obtained.

In each of the optical systems OL according to the first to fourth embodiments, it is desirable that the first lens group G1 includes at least one positive lens and the following conditional expression (9) be satisfied:

$$\nu P < 42.00 \tag{9}$$

where $\nu P$: the Abbe number of a positive lens with the smallest Abbe number among at least one positive lens in the first lens group G1.

The conditional expression (9) defines an appropriate range of the Abbe number of the positive lens with the smallest Abbe number among at least one positive lens in the first lens group G1. By satisfying the conditional expression (9), without increasing the size of the barrel, a chromatic aberration upon focusing on infinity can properly be corrected.

Because a corresponding value of the conditional expression (9) exceeds an upper limit value, the Abbe number of the positive lens with the smallest Abbe number among at least one positive lens in the first lens group G1 becomes too large, it becomes difficult to correct the chromatic aberration upon focusing on infinity without increasing the size of the barrel. The upper limit value of the conditional expression (9) is set to 40.00, 37.00, 35.00, or further 32.00, and the effects of each of the embodiments can thereby more certainly be obtained.

In each of the optical systems OL according to the first to fourth embodiments, it is desirable that the first focusing lens group GF1 move to the image side along the optical axis in focusing from an object at infinity to an object at a short distance. Accordingly, fluctuations in various aberrations including the spherical aberration in focusing from an object at infinity to an object at a short distance can be suppressed.

In each of the optical systems OL according to the first to fourth embodiments, it is desirable that the second focusing lens group GF2 move to the object side along the optical axis in focusing from an object at infinity to an object at a short distance. Accordingly, fluctuations in various aberrations including the spherical aberration in focusing from an object at infinity to an object at a short distance can be suppressed.

It is desirable that each of the optical systems OL according to the first to fourth embodiments satisfy the following conditional expression (10):

$$0.10 < MF1/MF2 < 20.00 \tag{10}$$

where MF1: the absolute value of a movement amount of the first focusing lens group GF1 in focusing from an object at infinity to an object at a short distance, and MF2: the absolute value of a movement amount of the second focusing lens group GF2 in focusing from an object at infinity to an object at a short distance.

The conditional expression (10) defines an appropriate relationship between the absolute value of the movement amount of the first focusing lens group GF1 in focusing from an object at infinity to an object at a short distance and the absolute value of the movement amount of the second focusing lens group GF2 in focusing from an object at infinity to an object at a short distance. By satisfying the conditional expression (10), fluctuations in various aberrations including the spherical aberration in focusing from an object at infinity to an object at a short distance can thereby be suppressed.

Because when a corresponding value of the conditional expression (10) exceeds an upper limit value, the movement amount of the first focusing lens group GF1 in focusing from an object at infinity to an object at a short distance becomes too large, it becomes difficult to suppress fluctuations in various aberrations including the spherical aberration in focusing from an object at infinity to an object at a short distance. The upper limit value of the conditional expression (10) is set to 18.50, 17.00, 15.00, 13.50, 12.00, 11.50, 11.00, 10.50, or further 10.00, and the effects of each of the embodiments can thereby more certainly be obtained.

Because when the corresponding value of the conditional expression (10) becomes below a lower limit value, the movement amount of the second focusing lens group GF2 in focusing from an object at infinity to an object at a short distance becomes too large, it becomes difficult to suppress fluctuations in various aberrations including the spherical aberration in focusing from an object at infinity to an object at a short distance. The lower limit value of the conditional expression (10) is set to 0.25, 0.40, 0.50, 0.60, 0.70, 0.80, or further 0.90, and the effects of each of the embodiments can thereby more certainly be obtained.

It is desirable that each of the optical systems OL according to the first to fourth embodiments satisfy the following conditional expression (11):

$$0.50 < \beta F1 < 15.00 \tag{11}$$

where $\beta F1$: a lateral magnification of the first focusing lens group GF1 upon focusing on infinity.

The conditional expression (11) defines an appropriate range of the lateral magnification of the first focusing lens group GF1 upon focusing on infinity. By satisfying the conditional expression (11), fluctuations in various aberrations including the spherical aberration in focusing from an object at infinity to an object at a short distance can thereby be suppressed.

Because when a corresponding value of the conditional expression (11) exceeds an upper limit value, the lateral magnification of the first focusing lens group GF1 upon focusing on infinity becomes too large, it becomes difficult to suppress fluctuations in various aberrations including the spherical aberration in focusing from an object at infinity to an object at a short distance. The upper limit value of the conditional expression (11) is set to 14.50, 14.00, 13.50, 13.00, 12.50, 12.00, or further 11.50, and the effects of each of the embodiments can thereby more certainly be obtained.

Because when the corresponding value of the conditional expression (11) becomes below a lower limit value, the lateral magnification of the first focusing lens group GF1 upon focusing on infinity becomes too small, it becomes difficult to suppress fluctuations in various aberrations including the spherical aberration in focusing from an object at infinity to an object at a short distance. The lower limit value of the conditional expression (11) is set to 0.60, 0.70, 0.85, 1.00, 1.25, 1.50, 1.74, or further 2.00, and the effects of each of the embodiments can thereby more certainly be obtained.

It is desirable that each of the optical systems OL according to the first to fourth embodiments satisfy the following conditional expression (12):

$$0.05 < \beta F2 < 1.00 \tag{12}$$

where $\beta F2$: a lateral magnification of the second focusing lens group GF2 upon focusing on infinity.

The conditional expression (12) defines an appropriate range of the lateral magnification of the second focusing lens group GF2 upon focusing on infinity. By satisfying the conditional expression (12), fluctuations in various aberrations including the spherical aberration in focusing from an object at infinity to an object at a short distance can thereby be suppressed.

Because when a corresponding value of the conditional expression (12) exceeds an upper limit value, the lateral magnification of the second focusing lens group GF2 upon focusing on infinity becomes too large, it becomes difficult to suppress fluctuations in various aberrations including the spherical aberration in focusing from an object at infinity to an object at a short distance. The upper limit value of the conditional expression (12) is set to 0.95, 0.90, 0.85, 0.80, 0.70, 0.60, 0.50, 0.40, or further 0.30, and the effects of each of the embodiments can thereby more certainly be obtained.

Because when the corresponding value of the conditional expression (12) becomes below a lower limit value, the lateral magnification of the second focusing lens group GF2 upon focusing on infinity becomes too small, it becomes difficult to suppress fluctuations in various aberrations including the spherical aberration in focusing from an object at infinity to an object at a short distance. The lower limit value of the conditional expression (12) is set to 0.06, 0.07, 0.08, 0.09, or further 0.10, and the effects of the present embodiment can thereby more certainly be obtained.

It is desirable that each of the optical systems OL according to the first to fourth embodiments satisfy the following conditional expression (13):

$$1.00 < \beta F1/\beta F2 \tag{13}$$

where $\beta$F1: the lateral magnification of the first focusing lens group GF1 upon focusing on infinity, and
$\beta$F2: the lateral magnification of the second focusing lens group GF2 upon focusing on infinity.

The conditional expression (13) defines an appropriate relationship between the lateral magnification of the first focusing lens group GF1 upon focusing on infinity and the lateral magnification of the second focusing lens group GF2 upon focusing on infinity. By satisfying the conditional expression (13), fluctuations in various aberrations including the spherical aberration in focusing from an object at infinity to an object at a short distance can thereby be suppressed.

Because when the corresponding value of the conditional expression (13) becomes below a lower limit value, the lateral magnification of the second focusing lens group GF2 upon focusing on infinity becomes too large, it becomes difficult to suppress fluctuations in various aberrations including the spherical aberration in focusing from an object at infinity to an object at a short distance. The lower limit value of the conditional expression (13) is set to 1.50, 2.00, 2.50, 3.00, 3.50, 5.00, 7.50, or further 10.00, and the effects of each of the embodiments can thereby more certainly be obtained. Further, an upper limit value of the conditional expression (13) is set to 110.00, 100.00, 80.00, 65.00, 50.00, or further 40.00, and the effects of each of the embodiments can thereby more certainly be obtained.

It is desirable that each of the optical systems OL according to the first to fourth embodiments satisfy the following conditional expression (14):

$$\{\beta F1 + (1/\beta F1)\}^{-2} < 0.250 \tag{14}$$

where $\beta$F1: the lateral magnification of the first focusing lens group GF1 upon focusing on infinity.

The conditional expression (14) defines an appropriate range of the lateral magnification of the first focusing lens group GF1 upon focusing on infinity. By satisfying the conditional expression (14), fluctuations in various aberrations including the spherical aberration in focusing from an object at infinity to an object at a short distance can thereby be suppressed.

When a corresponding value of the conditional expression (14) exceeds an upper limit value, it becomes difficult to suppress fluctuations in various aberrations including the spherical aberration in focusing from an object at infinity to an object at a short distance. The upper limit value of the conditional expression (14) is set to 0.230, 0.200, 0.185, 0.170, 0.150, 0.125, or further 0.100, and the effects of each of the embodiments can thereby more certainly be obtained. Further, a lower limit value of the conditional expression (14) is set to 0.000, 0.001, 0.003, or further 0.005, and the effects of the present embodiment can thereby more certainly be obtained.

It is desirable that each of the optical systems OL according to the first to fourth embodiments satisfy the following conditional expression (15):

$$\{\beta F2 + (1/\beta F2)\}^{-2} < 0.250 \tag{15}$$

where $\beta$F2: the lateral magnification of the second focusing lens group GF2 upon focusing on infinity.

The conditional expression (15) defines an appropriate range of the lateral magnification of the second focusing lens group GF2 upon focusing on infinity. By satisfying the conditional expression (15), fluctuations in various aberrations including the spherical aberration in focusing from an object at infinity to an object at a short distance can thereby be suppressed.

When a corresponding value of the conditional expression (15) exceeds an upper limit value, it becomes difficult to suppress fluctuations in various aberrations including the spherical aberration in focusing from an object at infinity to an object at a short distance. The upper limit value of the conditional expression (15) is set to 0.230, 0.200, 0.185, 0.170, 0.150, 0.125, or further 0.100, and the effects of each of the embodiments can thereby more certainly be obtained. Further, a lower limit value of the conditional expression (15) is set to 0.000, 0.001, 0.003, 0.005, 0.008, or further 0.010, and the effects of each of the embodiments can thereby more certainly be obtained.

Figure 8:
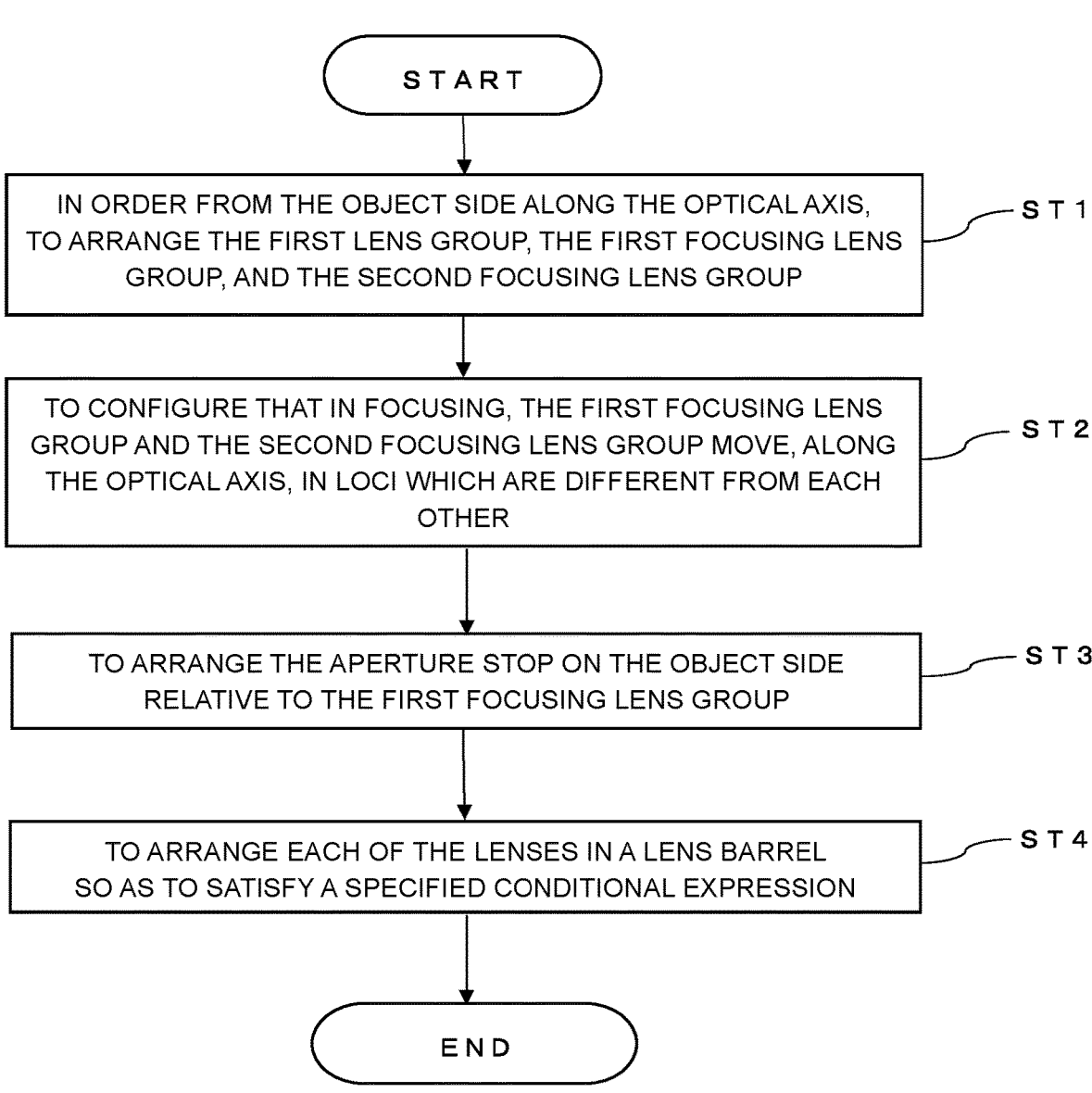
FIG. 8 is a flowchart illustrating a method for manufacturing an optical system according to a first embodiment.

Next, a method for manufacturing the optical system OL according to the first embodiment will be outlined with reference to FIG. 8. First, in order from the object side along the optical axis, the first lens group G1, the first focusing lens group GF1 having negative refractive power, and the second focusing lens group GF2 having positive refractive power are arranged (step ST1). Next, a configuration is made such that in focusing, the first focusing lens group GF1 and the second focusing lens group GF2 move, along the optical axis, in loci which are different from each other (step ST2). In addition, the aperture stop S is arranged on the object side relative to the first focusing lens group GF1 (step ST3). Furthermore, each of the lenses is arranged in a lens barrel such that at least the above conditional expression (1) is satisfied (step ST4). By such a method for manufacturing, it becomes possible to manufacture an optical system with small aberration fluctuations in focusing.

Figure 9:
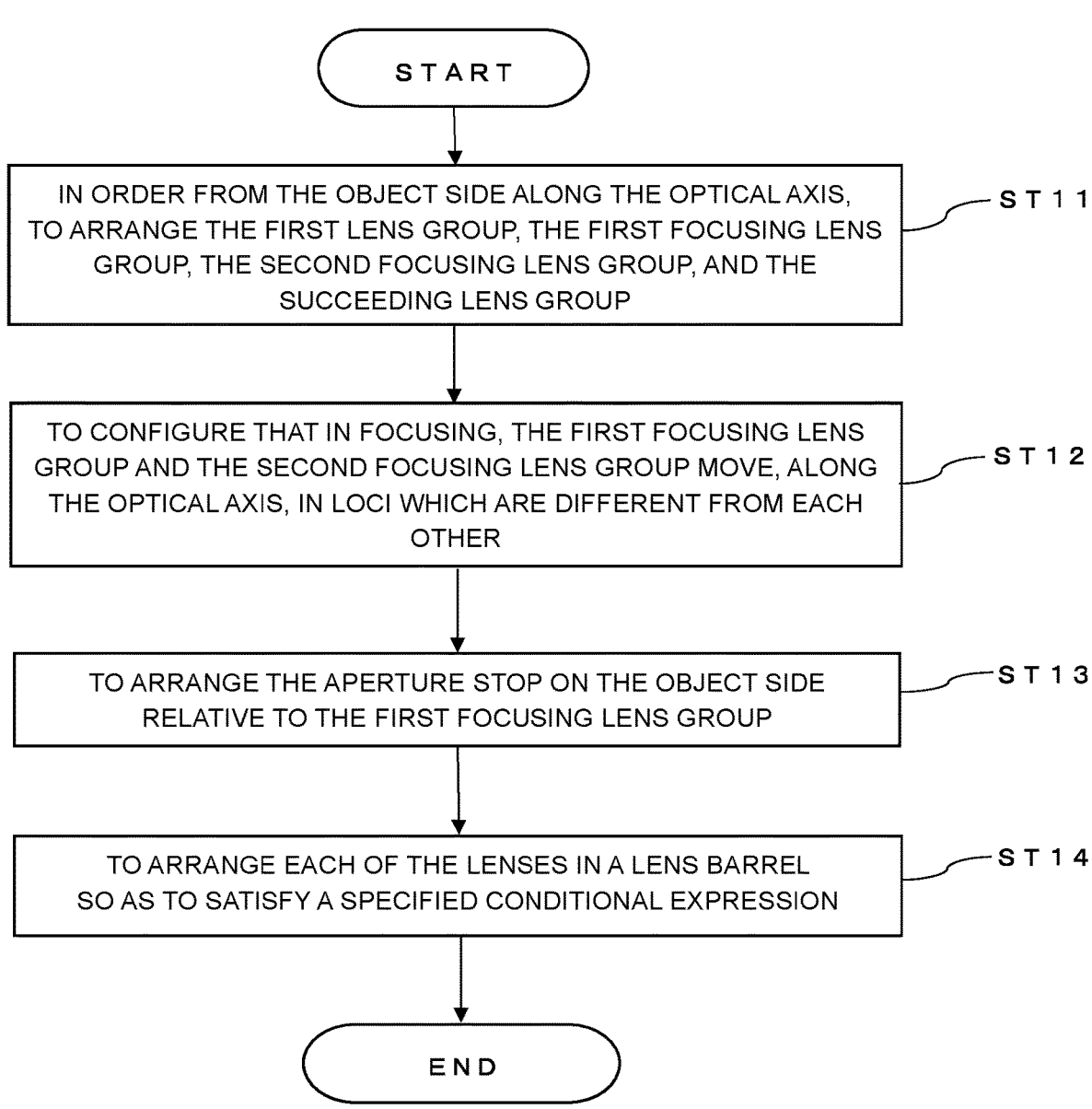
FIG. 9 is a flowchart illustrating a method for manufacturing an optical system according to a second embodiment.

Next, a method for manufacturing the optical system OL according to the second embodiment will be outlined with reference to FIG. 9. First, in order from the object side along the optical axis, the first lens group G1, the first focusing lens group GF1 having negative refractive power, the second focusing lens group GF2 having positive refractive power, and the succeeding lens group GR having negative refractive power are arranged (step ST11). Next, a configuration is made such that in focusing, the first focusing lens group GF1 and the second focusing lens group GF2 move, along the optical axis, in loci which are different from each other (step ST12). In addition, the aperture stop S is arranged on the object side relative to the first focusing lens group GF1 (step ST13). Furthermore, each of the lenses is arranged in a lens barrel such that at least the above conditional expression (2) is satisfied (step ST14). By such a method for manufacturing, it becomes possible to manufacture an optical system with small aberration fluctuations in focusing.

Figure 10:
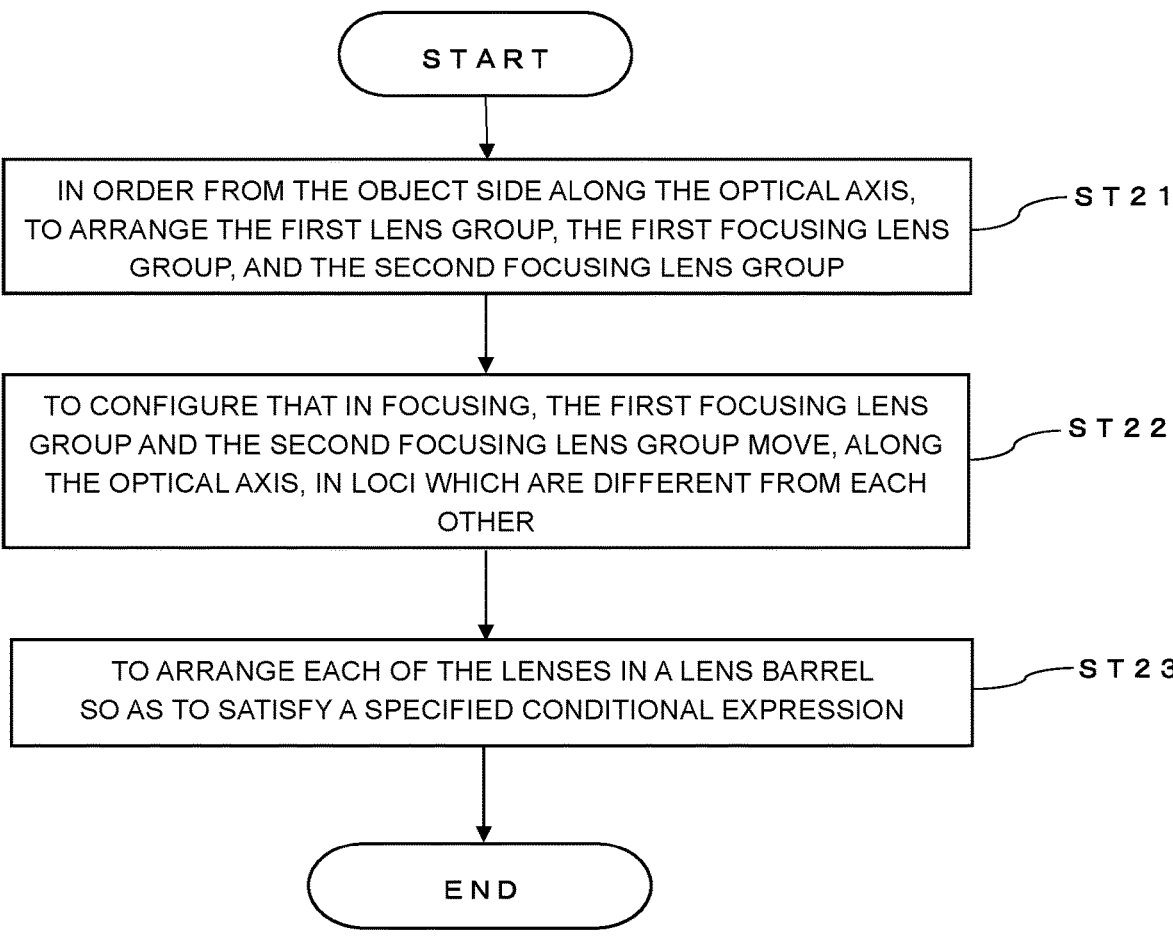
FIG. 10 is a flowchart illustrating a method for manufacturing an optical system according to a third embodiment.

Next, a method for manufacturing the optical system OL according to the third embodiment will be outlined with reference to FIG. 10. First, in order from the object side along the optical axis, the first lens group G1, the first focusing lens group GF1 having negative refractive power, and the second focusing lens group GF2 having positive refractive power are arranged (step ST21). Next, a configuration is made such that in focusing, the first focusing lens group GF1 and the second focusing lens group GF2 move, along the optical axis, in loci which are different from each other (step ST22). Furthermore, each of the lenses is arranged in a lens barrel such that at least the above conditional expression (3) is satisfied (step ST23). By such a method for manufacturing, it becomes possible to manufacture an optical system with small aberration fluctuations in focusing.

Figure 11:
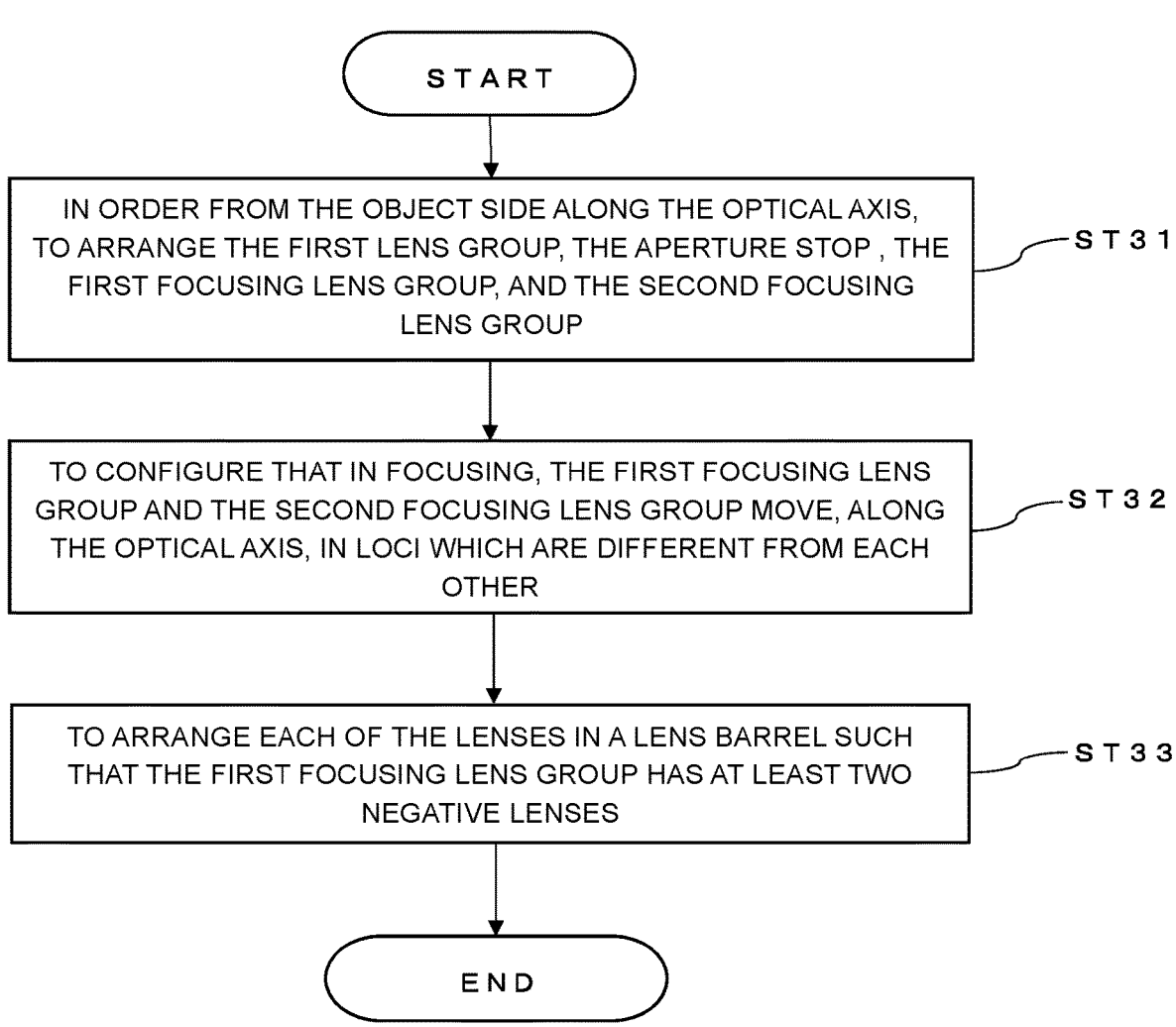
FIG. 11 is a flowchart illustrating a method for manufacturing an optical system according to a fourth embodiment.

Next, a method for manufacturing the optical system OL according to the fourth embodiment will be outlined with reference to FIG. 11. First, in order from the object side along the optical axis, the first lens group G1, the aperture stop S, the first focusing lens group GF1, and the second focusing lens group GF2 are arranged (step ST31). Next, a configuration is made such that in focusing, the first focusing lens group GF1 and the second focusing lens group GF2 move, along the optical axis, in loci which are different from each other (step ST32). Furthermore, each of the lenses is arranged in a lens barrel such that the first focusing lens group GF1 has at least two negative lenses (step ST33). By such a method for manufacturing, it becomes possible to manufacture an optical system with small aberration fluctuations in focusing.

EXAMPLES

Figure 3:
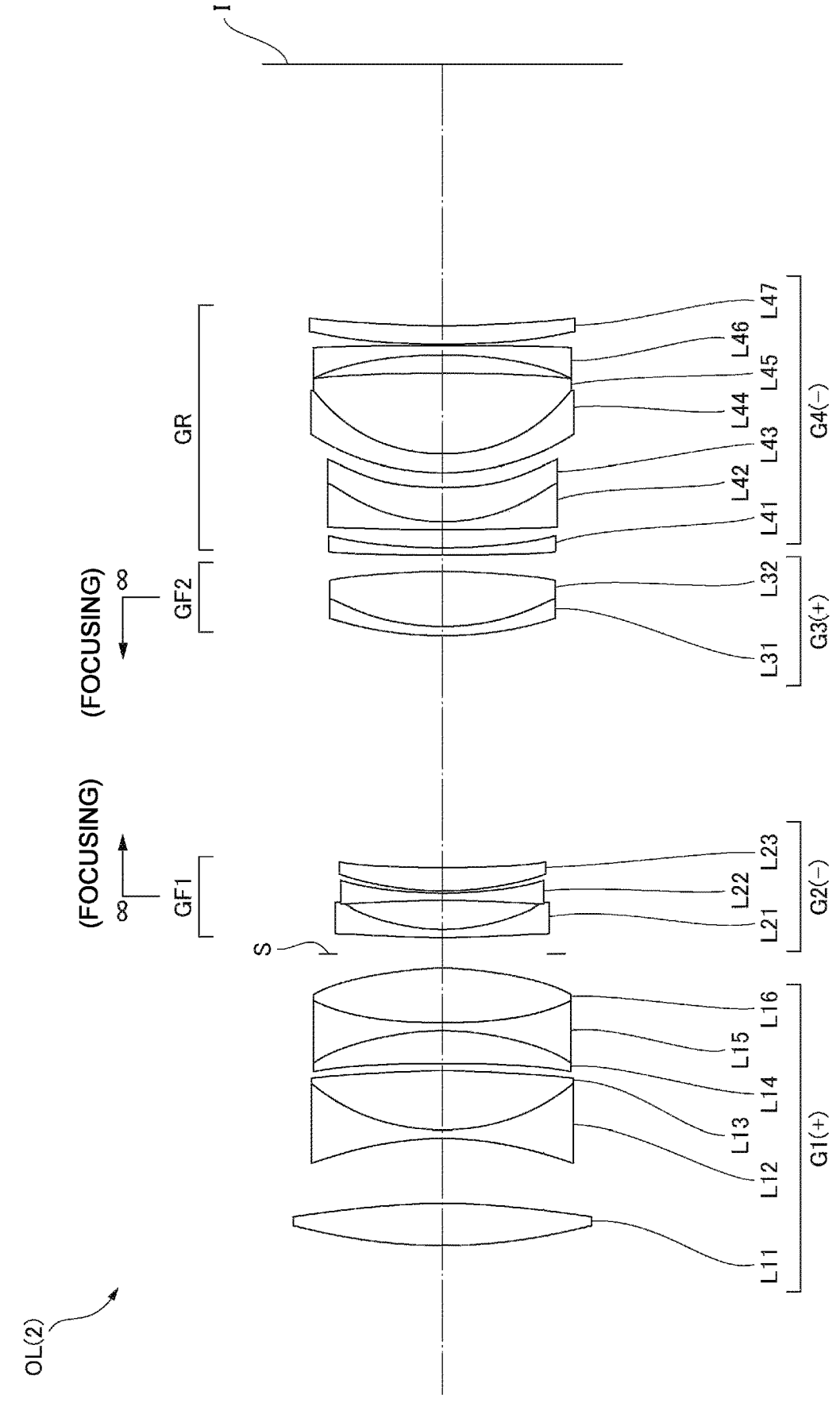
FIG. 3 is a diagram illustrating a lens configuration of an optical system according to a second example.
Figure 5:
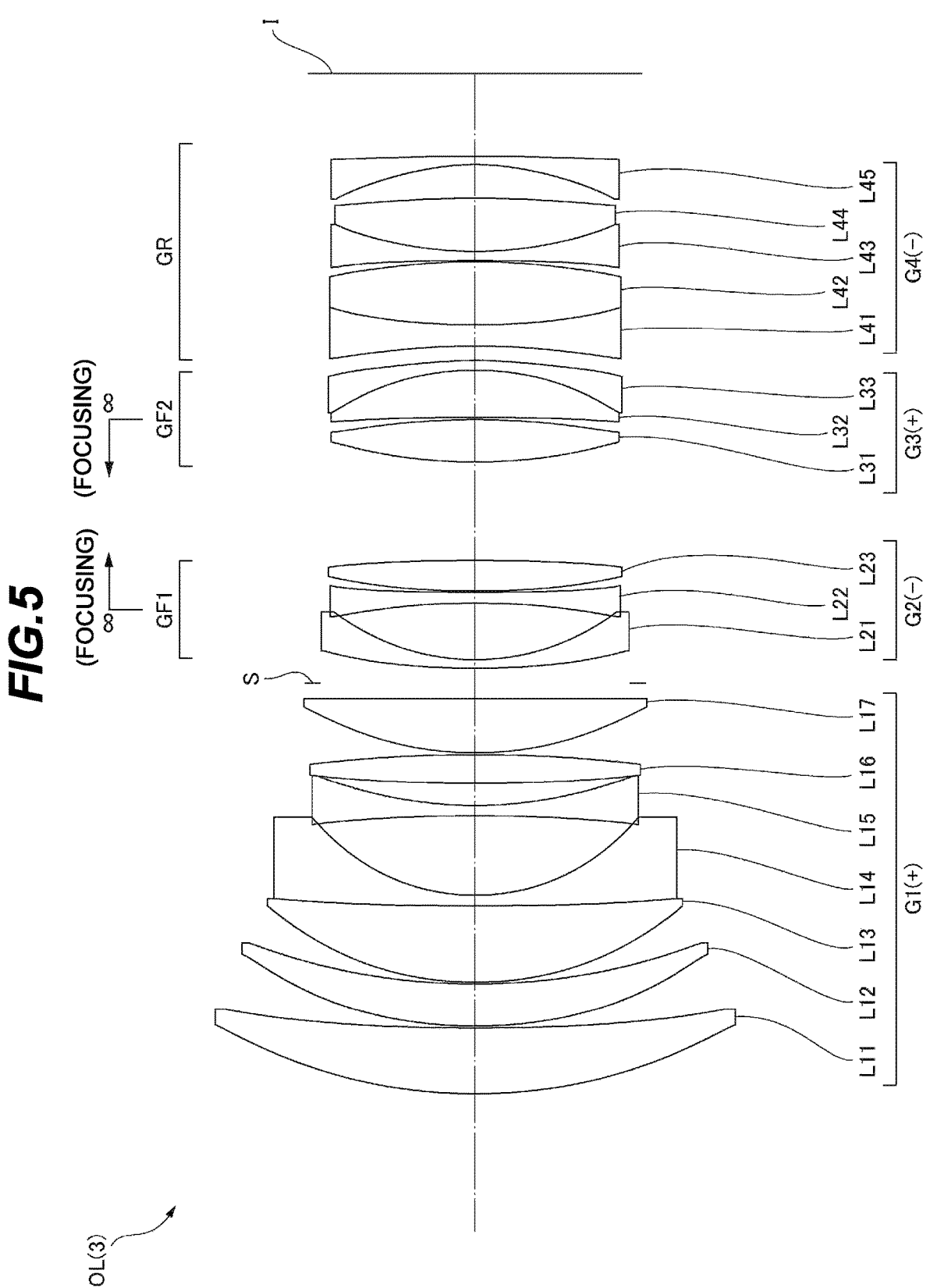
FIG. 5 is a diagram illustrating a lens configuration of an optical system according to a third example.

In the following, the optical systems OL according to examples of each of the embodiments will be described based on the drawings. FIG. 1, FIG. 3, and FIG. 5 are cross-sectional diagrams which respectively illustrate configurations and refractive power distribution of the optical systems OL {OL(1) to OL(3)} according to first to third examples. In the cross-sectional diagrams of the optical systems OL(1) to OL(3) according to the first to third examples, a movement direction of each of the lens groups along the optical axis in focusing from infinity to an object at a short distance is indicated by an arrow.

In FIG. 1, FIG. 3, and FIG. 5, each of the lens groups is denoted by a combination of a reference character G and a numeral, and each of the lenses is denoted by a combination of a reference character L and a numeral. In this case, in order to prevent a situation where kinds and the numbers of reference characters and numerals are increased and cause complication, lens groups and so forth are denoted by using independent combinations of reference characters and numerals for each of the examples. Thus, even when the same combinations of reference characters and numerals are used among the examples, this does not mean the same configuration.

Although table 1 to table 3 are illustrated in the following, among those, the table 1, the table 2, and the table 3 are tables which represent respective data of the first example, the second example, and the third example. In each of the examples, as targets of calculation of aberration characteristics, a d-line (wavelength $\lambda$=587.6 nm) and a g-line (wavelength $\lambda$=435.8 nm) are selected.

In a table of [General Data], f denotes a focal length of a whole lens system, FNO denotes an F-number, $2\omega$ denotes an angle of view (its unit is ""° " (degree), and $\omega$ denotes half an angle of view), and Ymax denotes a maximum image height. A reference character TL denotes a distance in which Bf is added to a distance from a lens foremost surface to a lens final surface on the optical axis upon focusing on infinity, and Bf denotes a distance (back focal length) from the lens final surface to the image surface I on the optical axis upon focusing on infinity.

Further, in the table of [General Data], $\beta$F1 denotes the lateral magnification of the first focusing lens group upon focusing on infinity. A reference character $\beta$F2 denotes the lateral magnification of the second focusing lens group upon focusing on infinity. A reference character MF1 denotes the absolute value of the movement amount of the first focusing lens group in focusing from an object at infinity to an object at a short distance. A reference character MF2 denotes the absolute value of the movement amount of the second focusing lens group in focusing from an object at infinity to an object at a short distance. A reference character Lfr denotes the distance, on the optical axis, from the lens surface of the optical system, which is closest to the object side, to the aperture stop. A reference character Lre denotes the distance, on the optical axis, from the aperture stop to the image surface. A reference character f1R denotes the combined focal length of the lens group arranged on the image side relative to the first lens group upon focusing on infinity.

In a table of [Lens Data], a surface number denotes order of optical surfaces from the object side along a direction in which a beam of light progresses, R denotes a radius of curvature of each of the optical surfaces (a positive value is given to a surface whose center of curvature is positioned on the image side), D denotes a surface distance as a distance on the optical axis from each of the optical surfaces to the next optical surface (or the image surface), nd denotes a refractive index of a material of an optical member with respect to the d-line, and vd denotes the Abbe number of the material of the optical member with respect to the d-line as a reference. A radius of curvature of "cc" denotes a flat surface or an opening, and (aperture stop S) denotes the aperture stop S. A refractive index nd of air=1.00000 is not indicated. In a case where the optical surface is an aspherical surface, "*" sign is given to the surface number, and a paraxial radius of curvature is indicated in a field of the radius of curvature R.

In a table of [Aspherical Surface Data], a shape of an aspherical surface indicated in [Lens Data] is expressed by the following expression (A). A term X(y) represents a distance (sag quantity), along an optical axis direction, from a tangential plane at an apex of the aspherical surface to a position on the aspherical surface at a height y, R denotes a radius of curvature (paraxial radius of curvature) of a reference spherical surface, $\kappa$ denotes a conic constant, and Ai denotes an aspherical coefficient at the i-th order. A term "E-n" denotes "$\times 10^{-n}$". For example, $1.234E\text{-}05 = 1.234 \times 10^{-5}$. Note that an aspherical coefficient A2 at the second order is zero and is not indicated.

$$X(y)=(y^2/R)/\{1+(1-\kappa \times y^2/R^2)^{1/2}\}+A4 \times y^4+A6 \times y^6+A8 \times y^8+A10 \times y^{10} \quad (A)$$

A table of [Variable Distance Data] indicates each surface distance at a surface number i for which the surface distance is (Di) in the table of [Lens data]. Further, the table of [Variable Distance Data] indicates each surface distance upon focusing on infinity and each surface distance upon focusing on a short distance object. In the table of [Variable Distance Data], f denotes the focal length of the whole lens system, and β denotes a photographing magnification. Further, D0 denotes a distance from an object to an optical surface, which is closest to the object side, in the optical system.

A table of [Lens Group Data] indicates a first surface (a surface closest to the object side) and a focal length of each of the lens groups.

In the following, in all of data values, "mm" is in general used for the focal lengths f, the radii of curvature R, the surface distances D, other lengths, and so forth, which appear herein, unless otherwise mentioned; however, this is not restrictive because the optical system can obtain equivalent optical performance even when the optical system is proportionally enlarged or proportionally shrunk.

The above descriptions about the tables are common to all of the examples, and the descriptions will not be repeated in the following.

First Example

The first example will be described by using FIG. 1, FIGS. 2A and 2B, and the table 1. FIG. 1 is a diagram illustrating a lens configuration of the optical system according to the first example. The optical system OL(1) according to the first example is formed from a first lens group G1 having positive refractive power, a second lens group G2 having negative refractive power, a third lens group G3 having positive refractive power, and a fourth lens group G4 having negative refractive power, which are arranged in order from the object side along the optical axis. In focusing from an object at infinity to an object at a short distance, the second lens group G2 moves to the image side along the optical axis, the third lens group G3 moves to the object side along the optical axis, and intervals between the neighboring lens groups are thereby changed. Note that in focusing, positions of the first lens group G1 and the fourth lens group G4 are fixed with respect to the image surface I. A reference character (+) or (−) given to each lens group character indicates refractive power of each lens group, and the same applies to all of the following examples.

The aperture stop S is disposed between the first lens group G1 and the second lens group G2. In focusing, a position of the aperture stop S is fixed with respect to the image surface I. In the present example, the second lens group G2 corresponds to the first focusing lens group GF1, the third lens group G3 corresponds to the second focusing lens group GF2, and the fourth lens group G4 corresponds to the succeeding lens group GR.

The first lens group G1 is formed from a negative meniscus lens L11 having a convex surface facing an object, a positive meniscus lens L12 having a convex surface facing the object, a negative meniscus lens L13 having a convex surface facing the object, a biconvex positive lens L14, a biconvex positive lens L15, and a cemented negative lens in which a biconcave negative lens L16 and a biconvex positive lens L17 are joined together, and the above lenses are arranged in order from the object side along the optical axis.

The second lens group G2 is formed from a negative meniscus lens L21 having a convex surface facing the object, a biconcave negative lens L22, and a biconvex positive lens L23, which are arranged in order from the object side along the optical axis.

The third lens group G3 is formed from a biconvex positive lens L31 and a biconvex positive lens L32, which are arranged in order from the object side along the optical axis. A lens surface of the positive lens L32 on the object side is an aspherical surface.

The fourth lens group G4 is formed from a biconcave negative lens L41 and a positive meniscus lens L42 having a convex surface facing the object, which are arranged in order from the object side along the optical axis. The image surface I is arranged on the image side of the fourth lens group G4.

The following table 1 raises values of data of the optical system according to the first example.

TABLE 1

| [General Data] | | | | |
|---|---|---|---|---|
| f = 58.199 | | | FNO = 2.884 | |
| 2ω = 41.16 | | | Ymax = 21.600 | |
| TL = 129.454 | | | Bf = 18.233 | |
| βF1 = 6.285 | | | βF2 = 0.193 | |
| MF1 = 1.071 | | | MF2 = 1.092 | |
| Lfr = 44.026 | | | Lre = 85.428 | |
| f1R = −73.793 | | | | |

| [Lens Data] | | | | |
|---|---|---|---|---|
| Surface Number | R | D | nd | νd |
| Object Surface | ∞ | | | |
| 1 | 70.9676 | 1.000 | 1.81600 | 46.59 |
| 2 | 24.5834 | 8.377 | | |
| 3 | 39.1849 | 3.877 | 1.90366 | 31.27 |
| 4 | 359.9017 | 12.338 | | |
| 5 | 80.4619 | 1.000 | 1.85026 | 32.35 |
| 6 | 27.7147 | 2.519 | | |
| 7 | 270.1842 | 2.882 | 1.80400 | 46.60 |
| 8 | −69.3419 | 0.200 | | |
| 9 | 30.8966 | 6.189 | 1.59319 | 67.90 |
| 10 | −36.3993 | 0.200 | | |
| 11 | −50.2592 | 1.000 | 1.84666 | 23.80 |
| 12 | 77.1654 | 3.308 | 1.81600 | 46.59 |
| 13 | −73.3678 | 1.136 | | |
| 14 | ∞ | (D14) | | (Aperture Stop S |
| 15 | 3039.8536 | 1.000 | 1.90366 | 31.27 |
| 16 | 26.6247 | 3.179 | | |
| 17 | −37.1406 | 1.000 | 1.72047 | 34.71 |
| 18 | 105.9932 | 0.237 | | |
| 19 | 69.8034 | 3.653 | 1.94595 | 17.98 |
| 20 | −54.1523 | (D20) | | |
| 21 | 285.7257 | 6.480 | 1.59319 | 67.90 |
| 22 | −41.9044 | 0.362 | | |
| 23* | 127.2840 | 4.094 | 1.59349 | 67.00 |
| 24 | −137.6180 | (D24) | | |
| 25 | −42.9609 | 1.000 | 1.80518 | 25.45 |
| 26 | 61.3138 | 0.200 | | |
| 27 | 36.3529 | 4.660 | 1.48749 | 70.31 |
| 28 | 95.2752 | Bf | | |
| Image Surface | ∞ | | | |

| [Aspherical Surface Data] |
|---|
| 23rd Surface |
| κ = 1.0000, A4 = 1.09713E−06, A6 = 2.87783E−09, A8 = −1.07908E−11, A10 = 1.55910E−14 |

| [Variable Distance Data] | | |
|---|---|---|
| | Upon focusing on infiinity f = 58.199 | Upon focusing on a short-distance β = −0.100 |
| D0 | ∞ | 567.971 |
| D14 | 2.000 | 3.071 |
| D20 | 24.22 | 22.120 |
| D24 | 15.048 | 16.140 |

TABLE 1-continued

[Lens Group Data]

| Group | Frist surface | Focal length |
|---|---|---|
| G1 | 1 | 31.774 |
| G2 | 15 | −39.196 |
| G3 | 21 | 40.437 |
| G4 | 25 | −41.889 |

Figure 2A:
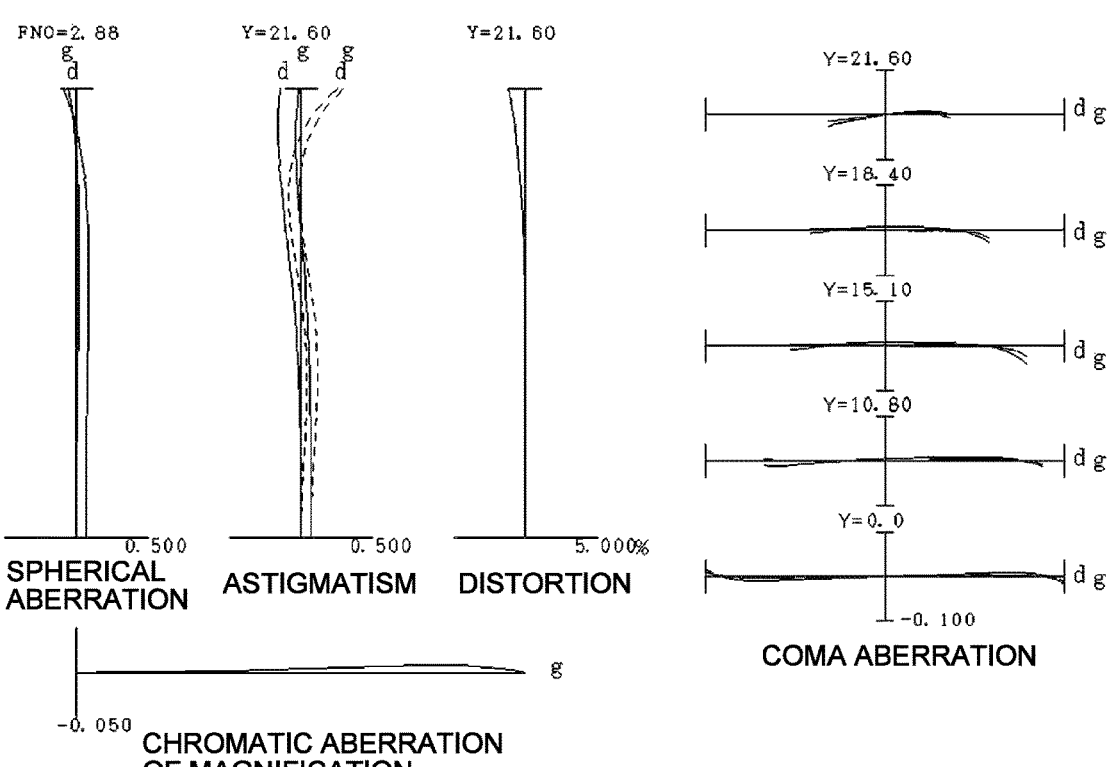
FIG. 2A and FIG. 2B respectively illustrate diagrams of various aberrations of the optical system according to the first example upon focusing on infinity and upon focusing on a short distance object.
Figure 2B:
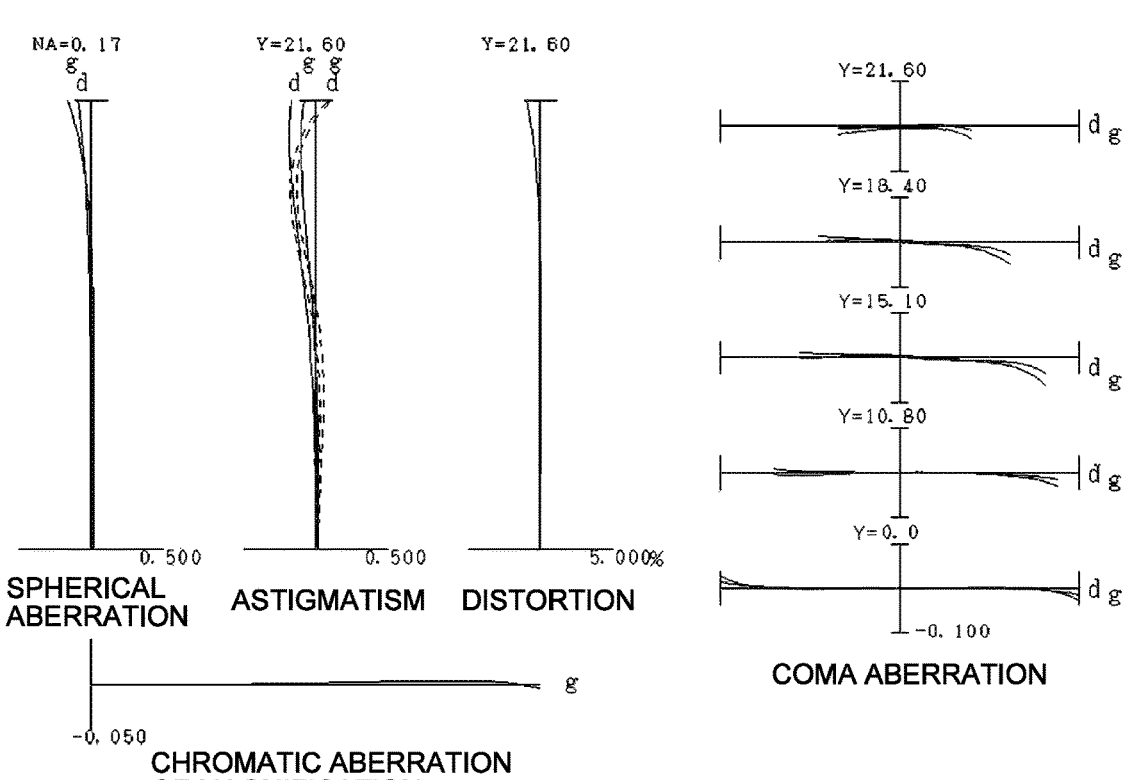

FIG. 2A illustrates diagrams of various aberrations of the optical system according to the first example upon focusing on infinity. FIG. 2B illustrates diagrams of various aberrations of the optical system according to the first example upon focusing on a short distance object. In each of the diagrams of aberrations upon focusing on infinity, FNO denotes an F-number, and Y denotes an image height. In each of the diagrams of aberrations upon focusing on a short distance object, NA denotes a numerical aperture, and Y denotes the image height. Note that a spherical aberration diagram indicates the value of the F-number or the numerical aperture which corresponds to the maximum aperture, an astigmatism diagram and a distortion diagram respectively indicate the maximum values of the image height, and a coma aberration diagram indicates the value of each image height. A reference character d denotes the d-line (wavelength λ=587.6 nm), and g denotes the g-line (wavelength λ=435.8 nm). In the astigmatism diagram, a solid line indicates a sagittal image surface, and a broken line indicates a meridional image surface. Note that also in diagrams of aberrations in each of the examples, which will be described in the following, similar reference characters to the present example will be used, and descriptions thereof will not be repeated.

Based on each of the diagrams of various aberrations, it may be understood that not only upon focusing on infinity but also focusing on a short distance object, the optical system according to the first example properly corrects various aberrations and exhibits excellent image formation performance.

Second Example

The second example will be described by using FIG. 3, FIGS. 4A and 4B, and the table 2. FIG. 3 is a diagram illustrating a lens configuration of the optical system according to the second example. The optical system OL(2) according to the second example is formed from a first lens group G1 having positive refractive power, a second lens group G2 having negative refractive power, a third lens group G3 having positive refractive power, and a fourth lens group G4 having negative refractive power, which are arranged in order from the object side along the optical axis. In focusing from an object at infinity to an object at a short distance, the second lens group G2 moves to the image side along the optical axis, the third lens group G3 moves to the object side along the optical axis, and intervals between the neighboring lens groups are thereby changed. Note that in focusing, positions of the first lens group G1 and the fourth lens group G4 are fixed with respect to the image surface I.

The aperture stop S is disposed between the first lens group G1 and the second lens group G2. In focusing, the position of the aperture stop S is fixed with respect to the image surface I. In the present example, the second lens group G2 corresponds to the first focusing lens group GF1, the third lens group G3 corresponds to the second focusing lens group GF2, and the fourth lens group G4 corresponds to the succeeding lens group GR.

The first lens group G1 is formed from a biconvex positive lens L11, a cemented negative lens in which a biconcave negative lens L12 and a biconvex positive lens L13 are joined together, and a cemented positive lens in which a positive meniscus lens L14 having a concave surface facing an object, a biconcave negative lens L15, and a biconvex positive lens L16 are joined together, and the above lenses are arranged in order from the object side along the optical axis. A lens surface of the positive meniscus lens L14 on the object side is an aspherical surface.

The second lens group G2 is formed from a negative meniscus lens L21 having a convex surface facing the object, a biconcave negative lens L22, and a positive meniscus lens L23 having a convex surface facing the object, and the above lenses are arranged in order from the object side along the optical axis.

The third lens group G3 is formed from a cemented positive lens, in which a negative meniscus lens L31 having a convex surface facing the object and a biconvex positive lens L32 are joined together in order from the object side along the optical axis. A lens surface of the negative meniscus lens L31 on the object side is an aspherical surface.

The fourth lens group G4 is formed from a negative meniscus lens L41 having a convex surface facing the object, a cemented negative lens in which a negative meniscus lens L42 having a convex surface facing the object and a positive meniscus lens L43 having a convex surface facing the object are joined together, a cemented positive lens in which a negative meniscus lens L44 having a convex surface facing the object and a biconvex positive lens L45 are joined together, a negative meniscus lens L46 having a concave surface facing the object, and a positive meniscus lens L47 having a convex surface facing the object, and the above lenses are arranged in order from the object side along the optical axis. The image surface I is arranged on the image side of the fourth lens group G4.

The following table 2 raises values of data of the optical system according to the second example.

TABLE 2

[General Data]

| f = 102.00 | FNO = 2.868 |
|---|---|
| 2ω = 24.42 | Ymax = 21.600 |
| TL = 149.455 | Bf = 33.258 |
| βF1 = 11.216 | βF2 = 0.113 |
| MF1 = 2.399 | MF2 = 0.255 |
| Lfr = 36.974 | Lre = 112.481 |
| f1R = −134.926 | |

[Lens Data]

| Surface Number | R | D | nd | vd |
|---|---|---|---|---|
| Object Surface | ∞ | | | |
| 1 | 73.3620 | 5.300 | 1.69680 | 55.52 |
| 2 | −109.7468 | 8.200 | | |
| 3 | −46.1075 | 1.000 | 1.84666 | 23.80 |
| 4 | 26.5543 | 7.524 | 1.92286 | 20.88 |
| 5 | −145.9538 | 0.887 | | |
| 6* | -339.5091 | 4.120 | 1.59319 | 67.90 |
| 7 | −38.3498 | 1.000 | 1.71736 | 29.57 |
| 8 | 49.2404 | 6.944 | 1.80400 | 46.60 |
| 9 | −43.5214 | 2.000 | | |
| 10 | ∞ | (D10) | | (Aperture Stop S) |
| 11 | 219.1588 | 1.000 | 1.83400 | 37.18 |
| 12 | 26.1206 | 3.581 | | |

TABLE 2-continued

| 13 | −165.9036 | 1.000 | 1.65160 | 58.62 |
| 14 | 62.1595 | 0.200 | | |
| 15 | 42.0615 | 2.965 | 1.94594 | 17.98 |
| 16 | 156.1083 | (D16) | | |
| 17* | 51.1323 | 1.000 | 1.94594 | 17.98 |
| 18 | 29.4695 | 7.000 | 1.81600 | 46.59 |
| 19 | −100.5432 | (D19) | | |
| 20 | 202.9270 | 1.000 | 1.59349 | 67.00 |
| 21 | 67.0793 | 2.320 | | |
| 22 | 372.0300 | 1.000 | 1.81600 | 46.59 |
| 23 | 22.8082 | 4.271 | 1.94594 | 17.98 |
| 24 | 30.7973 | 2.000 | | |
| 25 | 32.4194 | 2.177 | 2.00069 | 25.46 |
| 26 | 20.5772 | 10.299 | 1.83400 | 37.18 |
| 27 | −230.0301 | 2.427 | | |
| 28 | −48.5548 | 1.000 | 1.84666 | 23.80 |
| 29 | −1535.4051 | 0.200 | | |
| 30 | 80.9334 | 2.419 | 1.81600 | 46.59 |
| 31 | 147.0046 | Bf | | |
| Image Surface | ∞ | | | |

[Aspherical Surface Data]

6th Surface
$\kappa = 1.0000$, $A4 = -5.87404\text{E}-06$, $A6 = -2.70092\text{E}-09$,
$A8 = 2.40290\text{E}-12$, $A10 = -5.67289\text{E}-15$
17th Surface
$\kappa = 1.0000$, $A4 = 2.80605\text{E}-07$, $A6 = 3.18648\text{E}-09$,
$A8 = 2.40290\text{E}-12$, $A10 = 4.66027\text{E}-14$

[Variable Distance Data]

| | Upon focusing on infinity f = 102.000 | Upon focusing on a short-distance β = −0.100 |
| --- | --- | --- |
| D0 | ∞ | 1043.392 |
| D10 | 2.000 | 4.399 |
| D16 | 29.363 | 26.710 |
| D19 | 2.000 | 2.255 |

[Lens Group Data]

| Group | First surface | Focal length |
| --- | --- | --- |
| G1 | 1 | 50.642 |
| G2 | 11 | −38.835 |
| G3 | 17 | 46.021 |
| G4 | 20 | −70.977 |

Figure 4A:
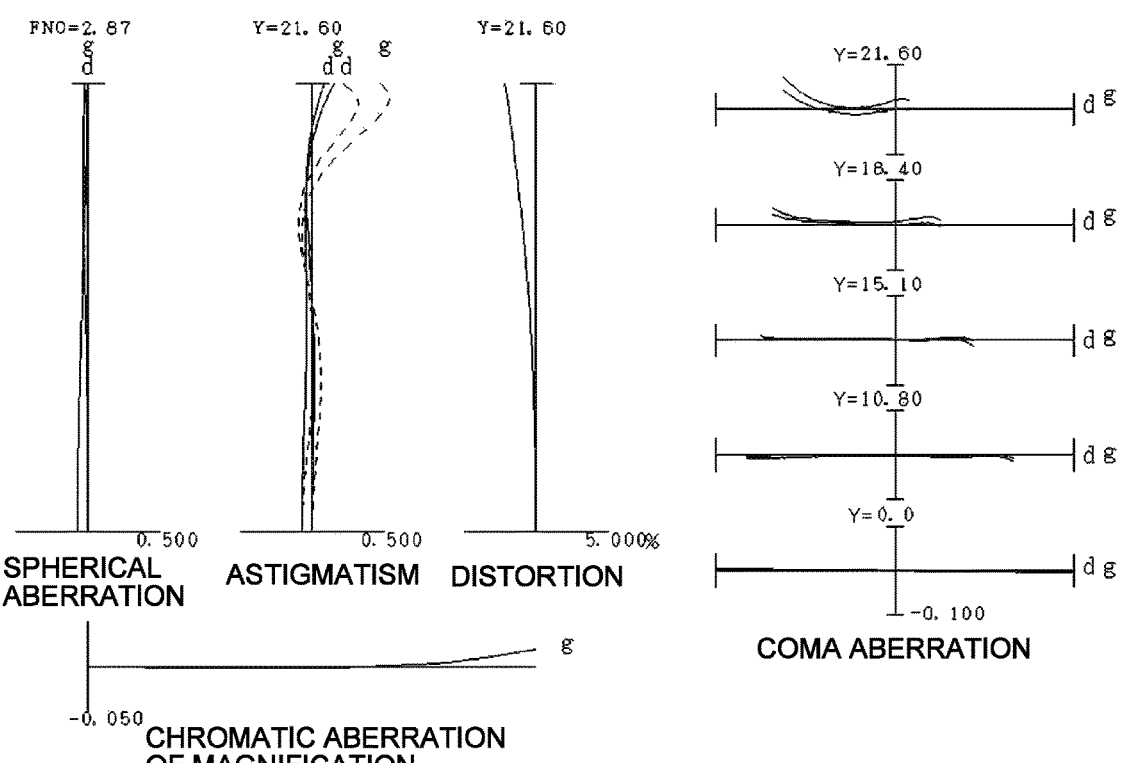
FIG. 4A and FIG. 4B respectively illustrate diagrams of various aberrations of the optical system according to the second example upon focusing on infinity and upon focusing on a short distance object.
Figure 4B:
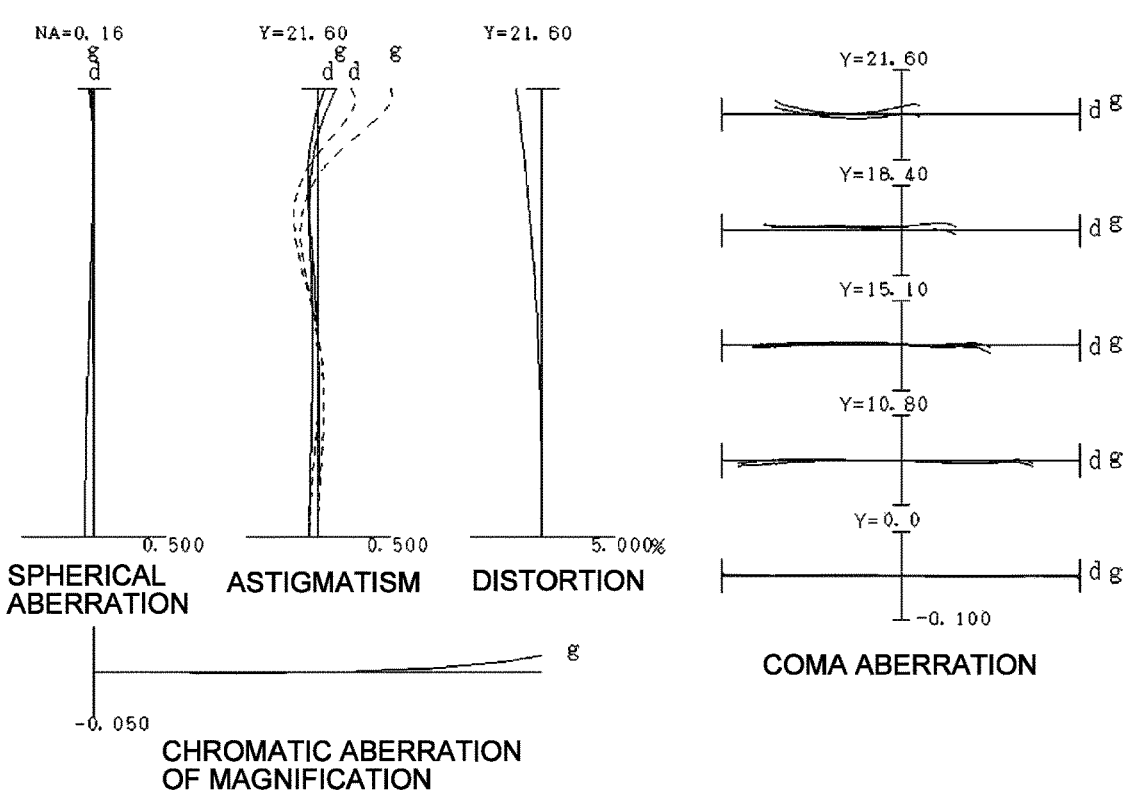

FIG. 4A illustrates diagrams of various aberrations of the optical system according to the second example upon focusing on infinity. FIG. 4B illustrates diagrams of various aberrations of the optical system according to the second example upon focusing on a short distance object. Based on each of the diagrams of various aberrations, it may be understood that not only upon focusing on infinity but also focusing on a short distance object, the optical system according to the second example properly corrects various aberrations and exhibits excellent image formation performance.

Third Example

The third example will be described by using FIG. 5, FIGS. 6A and 6B, and the table 3. FIG. 5 is a diagram illustrating a lens configuration of the optical system according to the third example. The optical system OL(3) according to the third example is formed from a first lens group G1 having positive refractive power, a second lens group G2 having negative refractive power, a third lens group G3 having positive refractive power, and a fourth lens group G4 having negative refractive power, which are arranged in order from the object side along the optical axis. In focusing from an object at infinity to an object at a short distance, the second lens group G2 moves to the image side along the optical axis, the third lens group G3 moves to the object side along the optical axis, and intervals between the neighboring lens groups are thereby changed. Note that in focusing, positions of the first lens group G1 and the fourth lens group G4 are fixed with respect to the image surface I.

The aperture stop S is disposed between the first lens group G1 and the second lens group G2. In focusing, the position of the aperture stop S is fixed with respect to the image surface I. In the present example, the second lens group G2 corresponds to the first focusing lens group GF1, the third lens group G3 corresponds to the second focusing lens group GF2, and the fourth lens group G4 corresponds to the succeeding lens group GR.

The first lens group G1 is formed from a positive meniscus lens L11 having a convex surface facing an object, a positive meniscus lens L12 having a convex surface facing the object, a cemented negative lens in which a positive meniscus lens L13 having a convex surface facing the object and a negative meniscus lens L14 having a convex surface facing the object are joined together, a biconcave negative lens L15, a biconvex positive lens L16, and a plano-convex positive lens L17 having a flat surface facing the image, and the above lenses are arranged in order from the object side along the optical axis.

The second lens group G2 is formed from a negative meniscus lens L21 having a convex surface facing the object, a biconcave negative lens L22, and a biconvex positive lens L23, which are arranged in order from the object side along the optical axis.

The third lens group G3 is formed from a biconvex positive lens L31 and a cemented positive lens in which a positive meniscus lens L32 having a concave surface facing the object and a negative meniscus lens L33 having a concave surface facing the object are joined together, and the above lenses are arranged in order from the object side along the optical axis.

The fourth lens group G4 is formed from a cemented positive lens in which a biconcave negative lens L41 and a biconvex positive lens L42 are joined together, a cemented negative lens in which a biconcave negative lens L43 and a biconvex positive lens L44 are joined together, and a negative meniscus lens L45 having a concave surface facing the object, and the above lenses are arranged in order from the object side along the optical axis. The image surface I is arranged on the image side of the fourth lens group G4.

The following table 3 raises values of data of the optical system according to the third example.

TABLE 3

[General Data]

| f = 83.99 | FNO = 1.220 |
| 2ω = 29.26 | Ymax = 21.600 |
| TL = 3.155 | Bf = 11.455 |
| MF1 = 2.314 | βF2 = 0.242 |
| Lfr = 56.098 | MF2 = 0.737 |
| f1R = 268.037 | Lre = 83.356 |

[Lens Data]

| Surface Number | R | D | nd | νd |
| --- | --- | --- | --- | --- |
| Object Surface | ∞ | | | |
| 1 | 72.5291 | 8.949 | 1.89286 | 20.36 |
| 2 | 244.3860 | 0.200 | | |
| 3 | 56.2010 | 5.840 | 1.81600 | 46.59 |

TABLE 3-continued

| | | | | |
|---|---|---|---|---|
| 4 | 89.2667 | 0.200 | | |
| 5 | 44.3978 | 10.589 | 1.49782 | 82.57 |
| 6 | 486.1002 | 1.400 | 1.85478 | 24.80 |
| 7 | 28.9470 | 10.930 | | |
| 8 | −192.3591 | 1.300 | 1.80518 | 25.45 |
| 9 | 59.8849 | 3.010 | | |
| 10 | 203.7409 | 3.984 | 1.81600 | 46.59 |
| 11 | −186.7775 | 0.200 | | |
| 12 | 46.7693 | 7.498 | 1.83481 | 42.73 |
| 13 | ∞ | 2.000 | | |
| 14 | ∞ | (D14) | | (Aperture Stop S) |
| 15 | 91.6235 | 1.300 | 1.84666 | 23.80 |
| 16 | 32.8343 | 7.655 | | |
| 17 | −99.1075 | 1.300 | 1.80518 | 25.45 |
| 18 | 227.4050 | 0.200 | | |
| 19 | 93.7043 | 4.280 | 1.94595 | 17.98 |
| 20 | −233.9384 | (D20) | | |
| 21 | 67.0639 | 6.000 | 1.77250 | 49.62 |
| 22 | −96.8252 | 0.200 | | |
| 23 | −319.2894 | 6.500 | 1.77250 | 49.62 |
| 24 | −36.1643 | 1.200 | 1.84666 | 23.80 |
| 25 | −88.0731 | (D25) | | |
| 26 | −112.9422 | 2.905 | 1.72825 | 28.38 |
| 27 | 81.8139 | 8.711 | 1.94595 | 17.98 |
| 28 | −92.3161 | 0.200 | | |
| 29 | −205.4633 | 1.200 | 1.73800 | 32.26 |
| 30 | 53.3478 | 7.178 | 1.51742 | 52.20 |
| 31 | −172.6355 | 4.534 | | |
| 32 | −40.6984 | 1.200 | 1.80400 | 46.60 |
| 33 | −456.5834 | Bf | | |
| Image Surface | ∞ | | | |

[Variable Distance Data]

| | Upon focusing on infinity f = 83.999 | Upon focusing on a short-distance β = −0.033 |
|---|---|---|
| D0 | ∞ | 2517.498 |
| D14 | 2.000 | 4.314 |
| D20 | 13.339 | 10.288 |
| D25 | 2.000 | 2.737 |

[Lens Group Data]

| Group | First surface | Focal length |
|---|---|---|
| G1 | 1 | 90.124 |
| G2 | 15 | −75.916 |
| G3 | 21 | 42.468 |
| G4 | 26 | −60.936 |

Figure 6A:
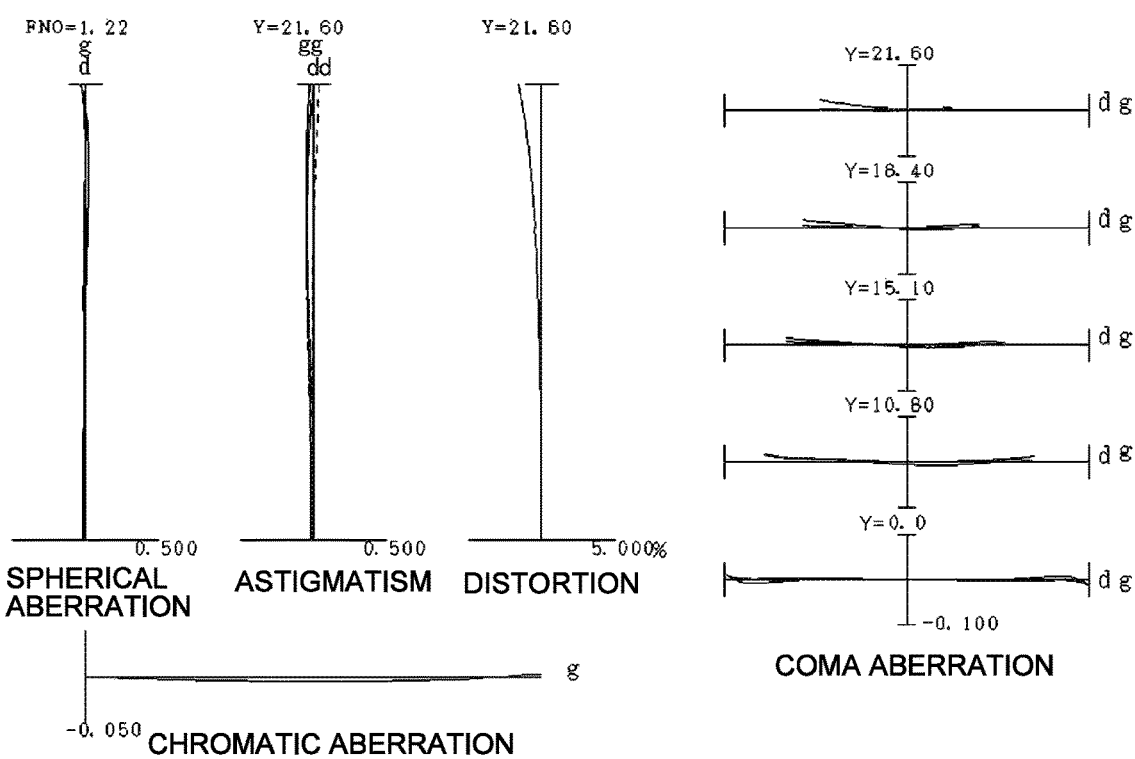
FIG. 6A and FIG. 6B respectively illustrate various aberrations of the optical system according to the third example upon focusing on infinity and upon focusing on a short distance object.
Figure 6B:
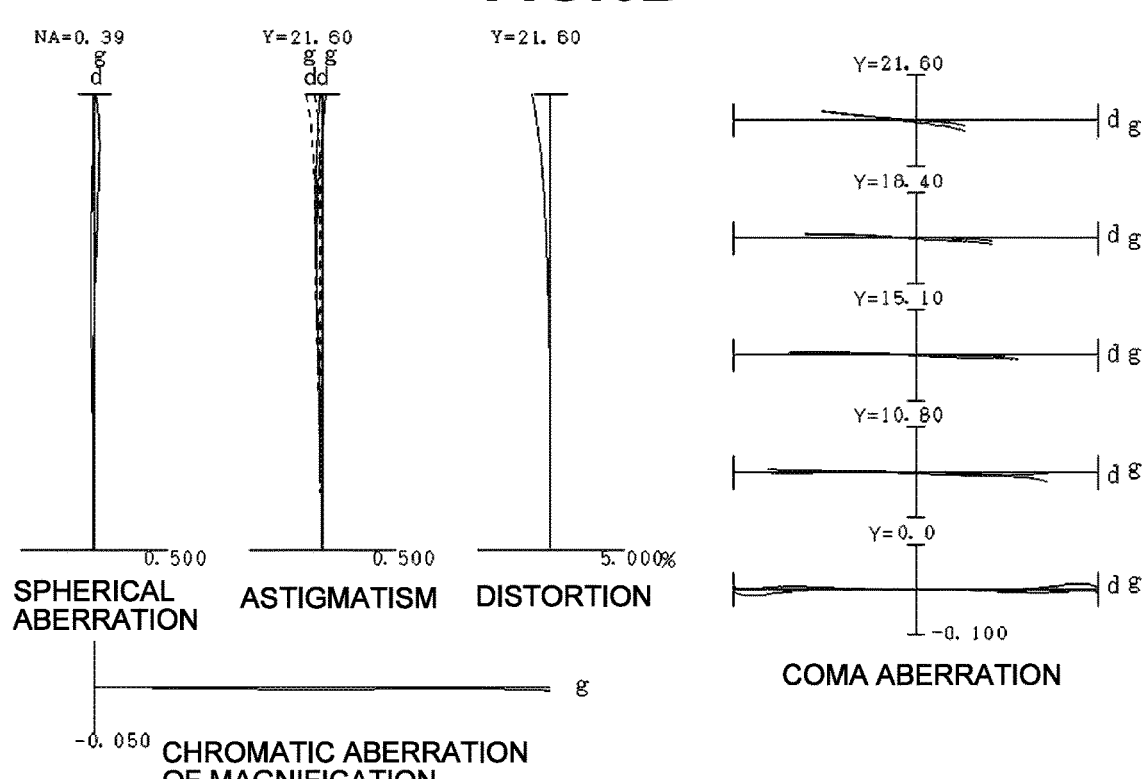

FIG. 6A illustrates diagrams of various aberrations of the optical system according to the third example upon focusing on infinity. FIG. 6B illustrates diagrams of various aberrations of the optical system according to the third example upon focusing on a short distance object. Based on each of the diagrams of various aberrations, it may be understood that not only upon focusing on infinity but also focusing on a short distance object, the optical system according to the third example properly corrects various aberrations and exhibits excellent image formation performance.

Next, a table of [Conditional Expression Corresponding Value] will be illustrated in the following. This table indicates, in a summarized manner, values corresponding to the conditional expressions (1) to (15) for all of the examples (first to third examples).

$$0.68 < (-fF1)/fF2 < 3.60 \quad \text{Conditional Expression (1)}$$

$$0.60 < fF2/(-fR) < 1.10 \quad \text{Conditional Expression (2)}$$

$$f1/|f1R| < 1.00 \quad \text{Conditional Expression (3)}$$

$$0.50 < Lre/Lfr < 4.00 \quad \text{Conditional Expression (4)}$$

$$0.45 < f1/(-fF1) < 2.50 \quad \text{Conditional Expression (5)}$$

$$0.55 < f1/fF2 < 3.00 \quad \text{Conditional Expression (6)}$$

$$0.10 < f1/f < 1.25 \quad \text{Conditional Expression (7)}$$

$$0.05 < Bf/f < 0.65 \quad \text{Conditional Expression (8)}$$

$$\nu P < 42.00 \quad \text{Conditional Expression (9)}$$

$$0.10 < MF1/MF2 < 20.00 \quad \text{Conditional Expression (10)}$$

$$0.50 < \beta F1 < 15.00 \quad \text{Conditional Expression (11)}$$

$$0.05 < \beta F2 < 1.00 \quad \text{Conditional Expression (12)}$$

$$1.00 < \beta F1/\beta F2 \quad \text{Conditional Expression (13)}$$

$$\{\beta F1 + (1/\beta F1)\}^{-2} < 0.250 \quad \text{Conditional Expression (14)}$$

$$\{\beta F2 + (1/\beta F2)\}^{-2} < 0.250 \quad \text{Conditional Expression (15)}$$

[Conditional Expression Corresponding Value](First to Third Example)

| Conditional Expression | First Example | Second Example | Third Example |
|---|---|---|---|
| (1) | 0.969 | 0.844 | 1.788 |
| (2) | 0.965 | 0.648 | 0.697 |
| (3) | 0.431 | 0.375 | 0.336 |
| (4) | 1.940 | 3.042 | 1.486 |
| (5) | 0.811 | 1.304 | 1.187 |
| (6) | 0.786 | 1.100 | 2.122 |
| (7) | 0.546 | 0.496 | 1.073 |
| (8) | 0.313 | 0.326 | 0.136 |
| (9) | 31.270 | 20.880 | 20.360 |
| (10) | 0.981 | 9.417 | 3.139 |
| (11) | 6.285 | 11.216 | 3.155 |
| (12) | 0.193 | 0.113 | 0.242 |
| (13) | 32.550 | 98.894 | 13.039 |
| (14) | 0.024 | 0.008 | 0.083 |
| (15) | 0.035 | 0.013 | 0.052 |

Each of the above examples can realize an optical system with small aberration fluctuations in focusing.

Each of the above examples represents one specific example of the invention of the present application, but the invention of the present application is not limited to those.

It is possible to appropriately employ the following contents in a range in which optical performance of the optical systems of the present embodiments is not impaired.

Four-group configurations are described as the examples of the optical systems of the present embodiments; however, the present application is not limited to those, and optical systems in other group configurations (for example, five groups, six groups, and so forth) can be formed. Specifically, a configuration is possible in which a lens or a lens group is added to a position, which is closest to the object side or closest to the image surface side, in the optical systems of the present embodiments. Note that a lens group denotes a portion having at least one lens that is separated by an air distance which changes in focusing.

A lens group or a partial lens group is moved so as to have a component in a vertical direction to the optical axis or is rotationally moved (swung) in an in-plane direction including the optical axis, and a vibration-proof lens group may thereby be provided which corrects an image blur caused due to camera shake.

A lens surface may be formed with a spherical surface or a flat surface or may be formed with an aspherical surface. A case where the lens surface is a spherical surface or a flat surface is preferable because processing, assembly, and adjustment of a lens become easy and degradation of optical performance due to errors in processing, assembly, and adjustment can be prevented. Further, the above case is preferable because degradation of representation performance is small even in a case where the image surface is deviated.

In a case where the lens surface is an aspherical surface, the aspherical surface may be any of an aspherical surface by a grinding process, a glass-molding aspherical surface in which glass is formed into an aspherical shape by a mold, and a composite type aspherical surface in which a resin is formed into an aspherical shape on a surface of glass. Further, the lens surface may be formed as a diffraction surface, and a lens may be formed as a gradient-index lens (GRIN lens) or a plastic lens.

Although it is preferable that an aperture stop be arranged between the first lens group and the second lens group, without providing a member as the aperture stop, its function may be provided by a frame of a lens instead.

In order to reduce a flare or a ghost and to achieve optical performance with high contrast, each lens surface may be coated with an anti-reflection film which has a high transmittance in a wide wavelength range.

EXPLANATION OF NUMERALS AND CHARACTERS

| G1 | first lens group | G2 | second lens group |
|----|------------------|----|-------------------|
| G3 | third lens group | G4 | fourth lens group |
| I | image surface | S | aperture stop |

The invention claimed is:

1. An optical system comprising a first lens group, a first focusing lens group having negative refractive power, and a second focusing lens group having positive refractive power, which are arranged in order from an object side along an optical axis, the first focusing lens group and the second focusing lens group moving along the optical axis in loci, which are different from each other, in focusing, the optical system further comprising an aperture stop which is arranged on the object side relative to the first focusing lens group, wherein the following conditional expressions are satisfied:

$$0.68 < (-fF1)/fF2 < 3.60$$

$$0.90 < Lre/Lfr < 4.00$$

where fF1: a focal length of the first focusing lens group, fF2: a focal length of the second focusing lens group, Lfr: a distance, on the optical axis, from a lens surface of the optical system, which is closest to the object side, to the aperture stop, and Lre: a distance, on the optical axis, from the aperture stop to an image surface.

2. An optical system comprising a first lens group, a first focusing lens group having negative refractive power, a second focusing lens group having positive refractive power, and a succeeding lens group having negative refractive power, which are arranged in order from an object side along an optical axis, the first focusing lens group and the second focusing lens group moving along the optical axis in loci, which are different from each other, in focusing, the optical system further comprising an aperture stop which is arranged on the object side relative to the first focusing lens group, wherein the following conditional expressions are satisfied:

$$0.60 < fF2/(-fR) < 1.10$$

$$0.75 < f1/(-fF1) < 2.50$$

where fF2: a focal length of the second focusing lens group, fR: a focal length of the succeeding lens group, f1: a focal length of the first lens group, and fF1: a focal length of the first focusing lens group.

3. An optical system comprising a first lens group, a first focusing lens group having negative refractive power, and a second focusing lens group having positive refractive power, which are arranged in order from an object side along an optical axis, the first focusing lens group and the second focusing lens group moving along the optical axis in loci, which are different from each other, in focusing, the following conditional expressions are satisfied:

$$f1/|f1R| < 1.00$$

$$0.75 < f1/(-fF1) < 2.50$$

where f1: a focal length of the first lens group, f1R: a combined focal length of a lens group arranged on an image side relative to the first lens group upon focusing on infinity, and fF1: a focal length of the first focusing lens group.

4. An optical system comprising a first lens group, an aperture stop, a first focusing lens group, and a second focusing lens group, which are arranged in order from an object side along an optical axis, the first focusing lens group and the second focusing lens group moving along the optical axis in loci, which are different from each other, in focusing, wherein the first focusing lens group includes at least two negative lenses, and the following conditional expression is satisfied:

$$0.90 < Lre/Lfr < 4.00$$

where Lfr: a distance, on the optical axis, from a lens surface of the optical system, which is closest to the object side, to the aperture stop, and Lre: a distance, on the optical axis, from the aperture stop to an image surface.

5. The optical system according to claim 3, further comprising an aperture stop which is arranged on the object side relative to the first focusing lens group.

6. The optical system according to claim 4, wherein the first focusing lens group has negative refractive power and the second focusing lens group has positive refractive power.

7. The optical system according to claim 2, wherein the following conditional expression is satisfied:

$$0.68 < (-fF1)/fF2 < 3.60$$

where fF1: the focal length of the first focusing lens group, and fF2: the focal length of the second focusing lens group.

8. The optical system according to claim 1, further comprising a succeeding lens group which is arranged on an image side relative to the second focusing lens group and has negative refractive power, wherein the following conditional expression is satisfied:

$$0.60 < fF2/(-fR) < 1.10$$

where fF2: the focal length of the second focusing lens group, and fR: a focal length of the succeeding lens group.

9. The optical system according to claim 1, wherein the following conditional expression is satisfied:

$$f1/|f1R| < 1.00$$

where f1: a focal length of the first lens group, and f1R: a combined focal length of a lens group arranged on an image side relative to the first lens group upon focusing on infinity.

10. The optical system according to claim 2, wherein the succeeding lens group includes at least two lens components.

11. The optical system according to claim 3, wherein the following conditional expression is satisfied:

$$0.50 < Lre/Lfr < 4.00$$

where Lfr: a distance, on the optical axis, from a lens surface of the optical system, which is closest to the object side, to the aperture stop, and Lre: a distance, on the optical axis, from the aperture stop to an image surface.

12. The optical system according to claim 1, wherein the following conditional expression is satisfied:

$$0.45 < f1/(-fF1) < 2.50$$

where f1: a focal length of the first lens group, and fF1: the focal length of the first focusing lens group.

13. The optical system according to claim 3, wherein the following conditional expression is satisfied:

$$0.55 < f1/fF2 < 3.00$$

where f1: the focal length of the first lens group, and fF2: a focal length of the second focusing lens group.

14. The optical system according to claim 1, wherein the following conditional expression is satisfied:

$$0.10 < f1/f < 1.25$$

where f1: a focal length of the first lens group, and f: a focal length of the optical system upon focusing on infinity.

15. The optical system according to claim 3, wherein the following conditional expression is satisfied:

$$0.05 < Bf/f < 0.65$$

where Bf: a back focal length of the optical system upon focusing on infinity, and f: a focal length of the optical system upon focusing on infinity.

16. The optical system according to claim 1, wherein the first lens group includes at least one positive lens, and the following conditional expression is satisfied:

$$vP < 42.00$$

where vP: an Abbe number of a positive lens with a smallest Abbe number among the at least one positive lens in the first lens group.

17. The optical system according to claim 1, wherein the first focusing lens group moves to an image side along the optical axis in focusing from an object at infinity to an object at a short distance.

18. The optical system according to claim 1, wherein the second focusing lens group moves to the object side along the optical axis in focusing from an object at infinity to an object at a short distance.

19. The optical system according to claim 1, wherein the following conditional expression is satisfied:

$$0.10 < MF1/MF2 < 20.00$$

where MF1: an absolute value of a movement amount of the first focusing lens group in focusing from an object at infinity to an object at a short distance, and MF2: an absolute value of a movement amount of the second focusing lens group in focusing from an object at infinity to an object at a short distance.

20. The optical system according to claim 1, wherein the following conditional expression is satisfied:

$$0.50 < \beta F1 < 15.00$$

where βF1: a lateral magnification of the first focusing lens group upon focusing on infinity.

21. The optical system according to claim 1, wherein the following conditional expression is satisfied:

$$0.05 < \beta F2 < 1.00$$

where βF2: a lateral magnification of the second focusing lens group upon focusing on infinity.

22. The optical system according to claim 1, wherein the following conditional expression is satisfied:

$$1.00 < \beta F1/\beta F2$$

where βF1: a lateral magnification of the first focusing lens group upon focusing on infinity, and βF2: a lateral magnification of the second focusing lens group upon focusing on infinity.

23. The optical system according to claim 1, wherein the following conditional expression is satisfied:

$$\{\beta F1 + (1/\beta F1)\}^{-2} < 0.250$$

where βF1: a lateral magnification of the first focusing lens group upon focusing on infinity.

24. The optical system according to claim 1, wherein the following conditional expression is satisfied:

$$\{\beta F2 + (1/\beta F2)\}^{-2} < 0.250$$

where βF2: a lateral magnification of the second focusing lens group upon focusing on infinity.

25. An optical apparatus which is configured to include the optical system according to claim 1.

26. A method for manufacturing an optical system comprising a first lens group, a first focusing lens group having negative refractive power, and a second focusing lens group having positive refractive power, which are arranged in order from an object side along an optical axis, the method comprising disposing the lens groups in a lens barrel so that:

the first focusing lens group and the second focusing lens group move along the optical axis in loci, which are different from each other, in focusing, the method further comprising one of the following features A, B, C and D, wherein the feature A includes configuring the optical system to further comprise an aperture stop which is arranged on the object side relative to the first focusing lens group, and disposing the lens groups in a lens barrel so that the following conditional expressions are satisfied:

$$0.68 < (-fF1)/fF2 < 3.60$$

$$0.90 < Lre/Lfr < 4.00$$

where fF1: a focal length of the first focusing lens group, fF2: a focal length of the second focusing lens group, Lfr: a distance, on the optical axis, from a lens surface of the optical system, which is closest to the object side, to the aperture stop, and Lre: a distance, on the optical axis, from the aperture stop to an image surface, the feature B includes configuring the optical system to further comprise a succeeding lens group having negative refractive power, and an aperture stop which is arranged on the object side relative to the first focusing lens group, and disposing the lens groups in a lens barrel so that:
the following conditional expressions are satisfied:

$$0.60 < fF2/(-fR) < 1.10$$

$$0.75 < f1/(-fF1) < 2.50$$

where fF2: a focal length of the second focusing lens group, fR: a focal length of the succeeding lens group, f1: a focal length of the first lens group, and fF1: a focal length of the first focusing lens group, the feature C includes disposing the lens groups in a lens barrel so that:

the following conditional expressions are satisfied:

$$f1/|f1R| < 1.00$$

$$0.75 < f1/(-fF1) < 2.50$$

where f1: a focal length of the first lens group, f1R: a combined focal length of a lens group arranged on an image side relative to the first lens group upon focusing on infinity, and fF1: a focal length of the first focusing lens group, and the feature D includes configuring the optical system to further comprise an aperture stop which is arranged between the first lens group and the first focusing lens group, and disposing the lens groups in a lens barrel so that:

the first focusing lens group includes at least two negative lenses, and the following conditional expression is satisfied:

$$0.90 < Lre/Lfr < 4.00$$

where Lfr: a distance, on the optical axis, from a lens surface of the optical system, which is closest to the object side, to the aperture stop, and Lre: a distance, on the optical axis, from the aperture stop to an image surface.

*     *     *     *     *